(12) United States Patent
Tattan et al.

(10) Patent No.: US 7,676,439 B2
(45) Date of Patent: Mar. 9, 2010

(54) ELECTRONIC DATA VAULT PROVIDING BIOMETRICALLY PROTECTED ELECTRONIC SIGNATURES

(75) Inventors: Oliver Tattan, Enniskerry (IE); Stephen Loughman, Bray (IE); Michael Murphy, Tenerure (IE); Michael Peirce, Ranelagh (IE); Conor White, Furbo (IE)

(73) Assignee: Daon Holdings Limited, Georgetown (KY)

( * ) Notice: Subject to any disclaimer, the term of this patent is extended or adjusted under 35 U.S.C. 154(b) by 1214 days.

(21) Appl. No.: 10/481,171

(22) PCT Filed: Jun. 18, 2002

(86) PCT No.: PCT/IE02/00081

§ 371 (c)(1),
(2), (4) Date: Dec. 17, 2003

(87) PCT Pub. No.: WO02/103496

PCT Pub. Date: Dec. 27, 2002

(65) Prior Publication Data

US 2004/0236694 A1    Nov. 25, 2004

(30) Foreign Application Priority Data

Jun. 18, 2001   (EP) ................................. 01650073
Dec. 14, 2001   (IE) ............................... S2001/1070

(51) Int. Cl.
*G06Q 99/00*   (2006.01)

(52) U.S. Cl. .............................. 705/67; 705/64; 705/76; 705/78; 705/79; 726/26; 726/30; 726/33; 713/186; 380/200; 380/201; 380/202

(58) Field of Classification Search .................. 705/51, 705/64–79; 725/26–33; 713/186; 380/200–203
See application file for complete search history.

(56) References Cited

U.S. PATENT DOCUMENTS

| | | | |
|---|---|---|---|
| 6,105,131 A | 8/2000 | Carroll | |
| 6,185,683 B1 * | 2/2001 | Ginter et al. | 713/176 |
| 6,246,989 B1 | 6/2001 | Polcyn | |
| 6,256,737 B1 | 7/2001 | Bianco et al. | |
| 6,357,010 B1 * | 3/2002 | Viets et al. | 726/4 |
| 6,957,199 B1 * | 10/2005 | Fisher | 705/78 |

(Continued)

FOREIGN PATENT DOCUMENTS

EP    0 917 120 A2    5/1999

(Continued)

OTHER PUBLICATIONS

Corcoran et al., "Smart Card and Biometrics: Your Key to PKI", Mar. 1, 1999.*

*Primary Examiner*—Jalatee Worjloh
(74) *Attorney, Agent, or Firm*—Kevin McDermott, Esq.

(57) ABSTRACT

An eVault system securely stores personal data and documents for citizens and allows controlled access by citizens and optionally by service providers. The eVault may be adapted to allow processes involving the documents to be carried out in a secure and paperless fashion. Documents are certified, and biometric matching is used for security. On effecting a match with a biometric identifier presented by a user, the user is allowed access to his personal eVault and to access a personal cryptographic key stored therein. One or more of these personal keys may be securely applied within the eVault to generate an electronic signature, amongst other functions.

15 Claims, 16 Drawing Sheets

U.S. PATENT DOCUMENTS

| | | | |
|---|---|---|---|
| 7,003,560 B1 * | 2/2006 | Mullen et al. | 709/223 |
| 2002/0078361 A1 * | 6/2002 | Giroux et al. | 713/183 |
| 2006/0161549 A1 * | 7/2006 | Bartkowiak et al. | 707/9 |
| 2007/0234067 A1 * | 10/2007 | Nanavati et al. | 713/186 |
| 2007/0291996 A1 * | 12/2007 | Hoffman et al. | 382/115 |
| 2008/0059250 A1 * | 3/2008 | Joao | 705/3 |

FOREIGN PATENT DOCUMENTS

| | | |
|---|---|---|
| EP | 0917119 A2 | 5/1999 |
| EP | 0950972 A2 | 10/1999 |
| WO | WO 99/26188 | 5/1999 |
| WO | WO 00/54214 | 9/2000 |
| WO | WO 99/54214 | 9/2000 |
| WO | WO 01/33936 A2 | 5/2001 |

* cited by examiner

Multi Level Authentication & Multi Modal Authentication Service

Post Authentication eVault Retrieval

ELECTRONIC DATA VAULT PROVIDING BIOMETRICALLY PROTECTED ELECTRONIC SIGNATURES

BACKGROUND OF THE INVENTION

1. Field of the Invention

The invention relates to management of personal documents & data, identity information and any other information relevant to citizens. In particular, the invention relates to the management of documents and data in a secure fashion using electronic (e–) signatures and in particular to a method and apparatus for utilising biometric techniques with such signatures.

2. Description of the Related Art

It should be appreciated that as used herein, "citizen" is intended to mean any person or user, including consumers and employees, and is not intended to be limited to any political definition thereof. Moreover, the term electronic signature as used herein is intended to indicate both symmetric key based electronic signatures and asymmetric (public key) digital signatures. At present, management of personal documents such as a passport or a driving licence is performed in hard copy. Performing transactions requiring such documents such as taxing a motor vehicle typically involves a complex procedure with much manual handling of documents and use of the postal system.

EP 0 917 119 describes a system for the safe, secure and properly authorized transfer of information while preserving individual privacy. It enables this by the provision of a first datastore including static identification information for a user, a second datastore including moderately dynamic personal data about a user and a third datastore including dynamic demographic information about a user. By utilising these multiple datastores it is possible to selectively access, organize and use personal data.

U.S. Pat. No. 6,105,131 discloses a secure server in a secure distributed information system that isolates interaction from terminals to specific personal vaults. A secure connection server is coupled to the system to enable authentication of a user and the data within the vault is protected against disclosure by encryption, against tampering by digital signatures and against un-trusted communications with unknown parties by digital certificates.

Although these known systems provide a level of security for access to data, the security is not based on personalised security features and is therefore open to tampering by persons of unscrupulous nature.

Electronic signatures are well known for the protection and authentication of electronic documents. They may be thought of as electronic code attached to (or associated with) a document which a) verifies the identity of the signer of the document and b) verifies that the document as signed by the signer has not been changed since the signing took place.

One common example of electronic signatures, commonly known as a digital signature, relies on public-key cryptography and hash functions to provide this verification. It will be appreciated that as used herein the term "electronic signature" also refers to any signature process including symmetric and asymmetric signatures, whereas the term "digital signature" typically refers to an asymmetric signature.

FIG. 1 shows an example of a signing process that is utilised for the application of such electronic signatures. The document to be signed is sent to a-one-way hash function (Step 1) that computes a small hash that is (practically) unique to the document (Step 2). This hash has 2 key properties; firstly the hash is unique to the contents of the document and any change in the contents will cause a completely different hash to be generated (good hash functions result in a completely different number being generated for even a single bit change within the document), and secondly the hash is "practically" unique. In other words, the probability of two documents generating the same hash is extremely unlikely. This probability is a function of the size of the output hash and the "distribution" of the algorithm across the bits in the hash.

The hash itself is usually much smaller than the document itself. This is to allow public key encryption of it to be as fast as possible (given the processing power of some terminals and smart cards it is not currently practical to asymmetrically encrypt large documents (e.g. 1 MB of data). For a given hash algorithm, the hash output is the same size regardless of the size of the original document.

Next, the hash is sent to a signing function (Step 3). This is effectively an asymmetric encryption routine that uses the signer's private key to encrypt the hash. It should be noted that for non-repudiation, there are certain requirements for the management of the private key.

The document and the signature (which may be embedded in the document or linked to it in some fashion) are then sent to the recipient or stored (Step 4).

FIG. 2 shows an example of how a signature on a document may then be verified. The signed document package comprising the document and the document signature is presented for verification (Step 20). The hash values associated with both the document and the document signature are then computed. In the case of the document signature this computation uses the public key of the signer to decrypt the signature. This decryption produces the original document hash (Step 21). The two computed hash values are then compared (Step 22). If the hash values are found to be equivalent then the document is verified as having a valid signature (Step 23). If the values are not equivalent then the signature is found invalid (Step 24).

Although these techniques are satisfactory in that they allow a level of security to be applied to documents that are transferred between two or more persons or institutions, the protected documents are still vulnerable to attack by unscrupulous persons. It will be appreciated from the explanation of how the signature is applied to a document (FIG. 1) and how a document with a signature is then verified that all that is required for an unscrupulous person to impersonate the user's signature is to gain access to the private key. Furthermore, the signature is only tested against the keys themselves, there is no recourse back to ascertain the actual identity of the user who created or owns the signature. Typically, the private key is electronically stored locally by the user on a personal computer/laptop of the user or within a smart card belonging to that user. As such there is a possibility that a person of unscrupulous nature could gain access to such a key by gaining access to the personal computer or smart card and thereby effectively impersonate the user. There, therefore, exists a need for a modified technique for use in the protection of electronic documents.

Thus, the invention is directed towards providing improved convenience and security for management of personal documents and other items of data by citizens. It is a further object of the present invention to provide a method and apparatus for the improved control of electronic signature systems.

SUMMARY OF THE INVENTION

According to the invention, there is provided a citizen data vault and data processing system (eVault) comprising means for securely storing personal data and/or documents for citizens, and a citizen interface for allowing controlled access by citizens.

In one embodiment, the system further comprises a service provider interface for allowing controlled access by service providers for (a) updating the data and documents and (b) performing processes requiring access to the data and documents.

In a further embodiment, the system comprises means for certifying data or documents.

In one embodiment, the system comprises means for storing the data and documents in distributed locations and for prosecuting a single centralised view to citizens.

In another embodiment, the citizen interface comprises means for allowing access using a plurality of different types of devices including telephones and Web browsers, kiosks, ATMs, PDAs, mobile devices and the like.

In a further embodiment, the system comprises means for performing multi-modal biometric authentication.

In one embodiment, the system further comprises a work flow processing sub-system which comprises means for executing processes in communication with service providers.

In another embodiment, the sub-system comprises means for enabling completion of service application forms online and for automatically populating parts of the forms using data retrieved from within the system.

In another embodiment, the system comprises means for performing authentication or verification of citizens using biometric matching.

In another embodiment the system securely stores one or more citizen signing keys, and applies the keys to securely generate electronic signatures on the citizen's behalf.

In one embodiment, the system comprises means for storing one or more cryptographic keys for citizens and for making them available for secure communication between the citizen and service providers or other third parties. By effecting a storage of cryptographic keys and enabling access to these stored keys via an authentication of a user by means of verification of a user's biometric, the present invention provides an association between the biometric identity of the user and at least one cryptographic key for that user.

In a further embodiment the present invention provides for the use of biometric technologies to provide a secure layer on top of electronic signature algorithms.

The present invention enables the incorporation of a biometric identifier with a specific user's electronic signature by enabling the association of that specific identifier with the signature at the time of creation of the signature. The invention may also allow for the association of a biometric identifier with a previously created signature.

Typically, a biometric identifier is based on a biometric sample presented by a user. This sample may be used as the biometric identifier itself, or may be subjected to a processing wherein specific features of the actual sample are extracted and processed so as to form a biometric template, which is linkable to the originating sample. Within the present specification the term biometric identifier is intended to cover both biometric samples and templates formed from such samples.

Accordingly, the present invention provides a method of associating at least one cryptographic key with at least one biometric identifier of that user as detailed in the appended claims. The cryptographic key(s) are stored securely in a key trust, which can be thought of as a secure logical component of a user's e-vault data. The key trust.may or may not be located physically separate from the main e-vault, as is possible within a distributed e-vault architecture.

The invention additionally provides a method of retrieving an electronic document as detailed in the appended claims.

The method may additionally require the additional step of requiring a new user that is presenting a biometric to be associated with a prior registered user prior to any storage of personal identifiers for the new user. In effect, the prior existing user signs the biometric enrolment of the new user using the prior user's biometric to authenticate themselves.

The present invention may optionally provide for an additional component, a biometric identifier, to be associated with the document. This, it will be appreciated, may be achieved by embedding a biometric identifier that has undergone one or more transformations, into the document. Examples of such transformations include, but are not limited to, encryption using one or more keys and/or the application of a one-way function to the biometric identifier. Accordingly, it will be appreciated that in this embodiment the present invention provides for the incorporation of one or more biometric identifiers within an electronic signature so as to effect an increase in security associated with that electronic signature.

It will be appreciated that the present invention, in addition to associating the electronic signature with the biometric identifier, also enables the association of the biometric identifier with the owner of the biometric identifier. To this end, a record will be retained of the nature of proof of identity provided at the time of enrolment of the biometric identifier. This will typically be implemented in a similar manner to that currently known for the provision of public key infrastructure services wherein individuals are identified at the time that they are assigned asymmetric key pairs.

It will be appreciated that the biometric identifier can be any one of a plurality of identifier types including but not limited to finger, iris, hand, face, voice and retina samples. Alternatively, as detailed above the biometric identifier may be a compact summary representation of the actual biometric sample, based on pertinent features of the particular sample. Such a summary is typically referred to as a biometric template.

These and other features of the present invention will be better understood with reference to the following drawings.

DETAILED DESCRIPTION OF THE INVENTION

Figure 1:
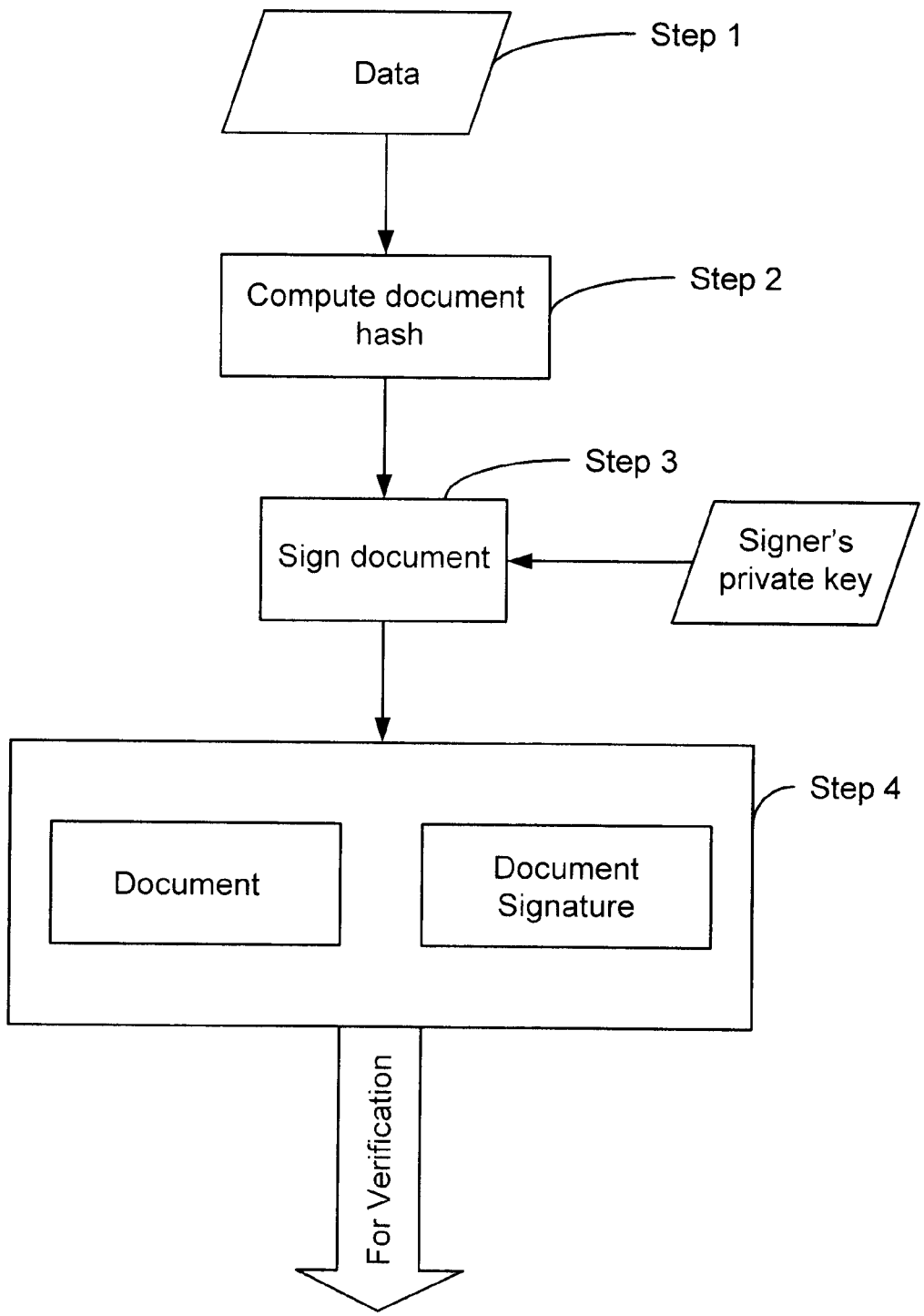
FIG. 1 outlines the steps associated with a traditional form of electronic signature application.
Figure 2:
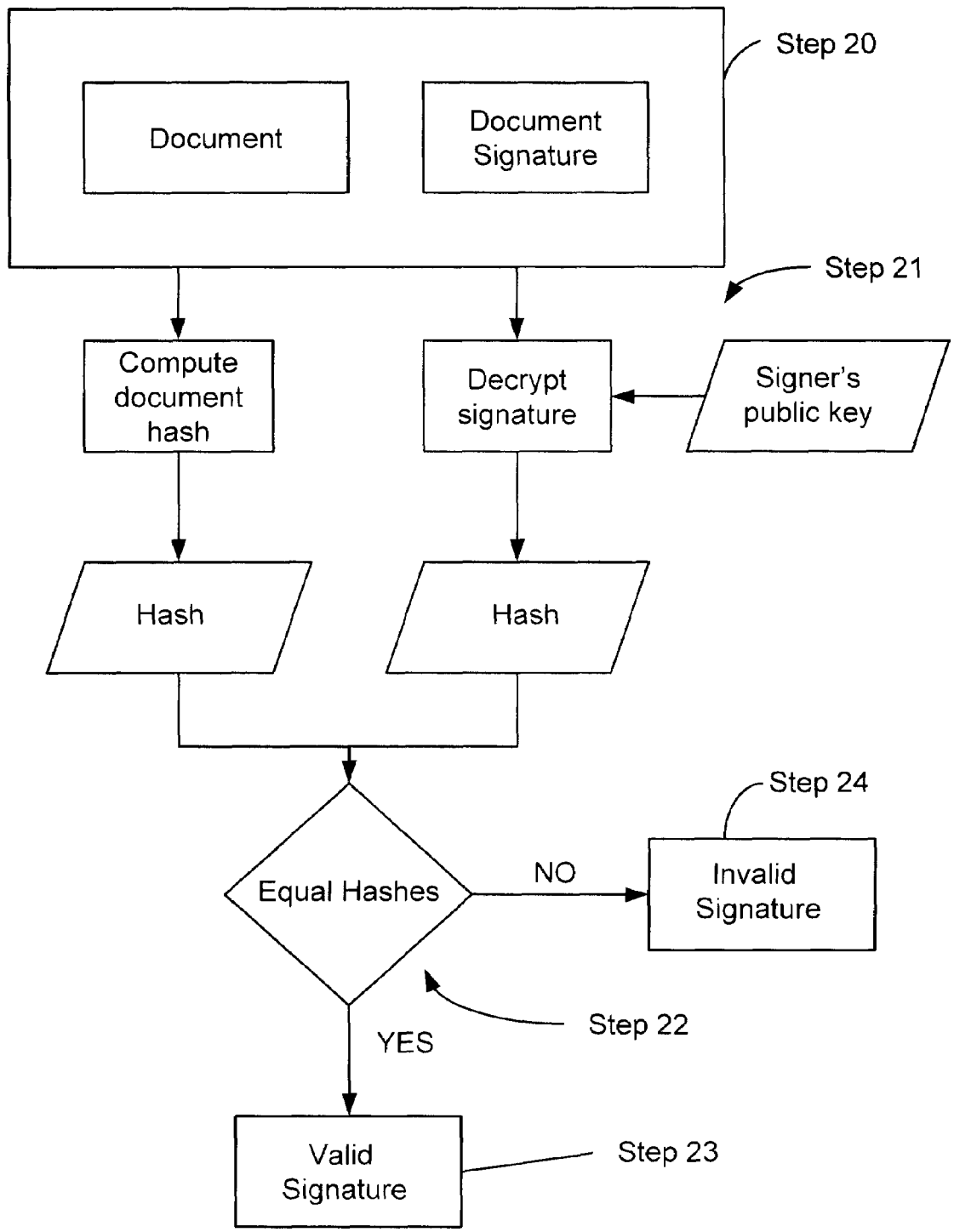
FIG. 2 shows a known process for the verification of document signatures.

FIGS. 1 and 2 have been previously described with reference to the prior art so as to describe the traditional mode of application of a digital or electronic signature to a document or data.

The present invention provides for the access to a user specific cryptographic key through a biometric associated with that user. By facilitating the association of a biometric with at least one cryptographic key the system enables the secure remote electronic storage of documents and data relating to a specific user. It also enables the transfer from a local to a remote storage area of at least one cryptographic key associated with a user. This interaction between non-person specific security implementations and person specific enables the provision of secure networked infrastructures previously not possible. To understand the functionality of the type of network architecture that may be realised in an implementation of a system of the present invention some of the typical components will now be defined. These definitions are not intended to limit the present invention to the presence or otherwise of the specific components and are intended for illustrative and explanatory purposes only.

Client

A client is the client software resident on the biometric device and any associated computing devices such as Personal Computers, Personal Digital Assistants (PDAs) and mobile phones. The client software is utilised by a user or citizen within the evault network environment.

Authentication Engine

An Authentication Engine (AE) is the entity responsible for capturing enrolments and asserting an individual's identity based on a presented biometric. The AE typically works in three modes.
1. Verification—where both a unique claim and a biometric identifier are presented.
2. Identification—where only a biometric identifier is presented.
3. Segregated Identification—where a partial claim (e.g. non unique claim such as date of birth or PIN) and a biometric identifier are presented.

Biometric Reader

A biometric reader is a biometric capture device. The term reader is intended to include devices suitable for reading various biometric modalities including, but not limited to, finger, iris, voice and face.

Key Trust

A Key Trust is a highly secure component tasked with managing the private keys of the individual enrolees. The Key Trust carries out the signing of the documents on behalf of the signers—once their identity has been properly asserted by a recognised AE. Typically, for security purposes, all signing operations are carried out in secure hardware, although it will be appreciated that this is not intended to limit the key trust application to such hardware configurations as alternatives may be apparent to those skilled in the art (for example, implementing the cryptographic routines in software).

Document

A document is an object that can be signed. Documents can include traditional electronic documents in a variety of formats (e.g. text, Adobe PDF etc.) or can include items such as, but not limited to, images and binary files.

Document Repository

A document repository manages the documents that are being signed and optionally stores the resulting signatures.

Certificate Authority

The Certificate Authority (CA) is responsible for signing the public keys for all enrolees within the scheme. A CA is also usually required to issue and sign keys used by the various components (e.g. AE) which sign responses.

It should be noted that a separate CA is not required in the scheme, and this is particularly applicable in certain applications of the method of the present invention where the issuance of a certificate may not be required. It is generally used if there are further applications, which want to carry out verification of the biometrically protected digital signatures. In many cases, if the system outlined here is the only system required to validate the signatures, then the external CA may not be required—the authenticity of the keys being asserted by the Key Trust itself.

Enrolment Application

An enrolment application is one that captures the enrolment information for a new enrolee. This may be a separate component related to the authentication engine or it may be a callable component integrated with a trusted partner application (for example a document management engine).

Utilising such architecture components it is possible for a user to be enrolled to use such a system according to the present invention, although it will be appreciated that such illustrated components are exemplary of the type of system architecture that may be utilised. The present invention provides a method of associating an electronic signature with a specific user. By storing a set having one or more personal identifiers associated with the user, the identifiers including at least one biometric sample, and linking the set of personal identifiers with a key or keys generated for that user, it is possible to subsequently create a digital signature by providing at least one biometric sample. It will be appreciated that this set of personal identifiers typically includes information that conforms in large part to the data elements of x.500 addressing, although as will be appreciated by those skilled in the art this is not intended to limit the application of the present invention to such addressing.

In the case of x.500, such data includes, but is not limited to, common name, distinguished name, e-mail, organization, organizational unit and address.

Within the present invention the components of a network architecture including a key trust, authentication engine and document repository form collectively what is called an eVault which provides functionality for storing and controlling access to citizen documents and information. The eVault and associated processing systems provide for the citizen improved privacy and autonomy, convenience, security, personalisation, and compliance. The processes are citizen-centric and can include life event, identity confirmation, service/event tracking processes, and other personal processes. The eVault stores and manages basic and extended citizen, biometric identity, and service/event monitoring information. These processes can be implemented in conjunction with a Government services portal providing information about services and application forms.

Figure 3:
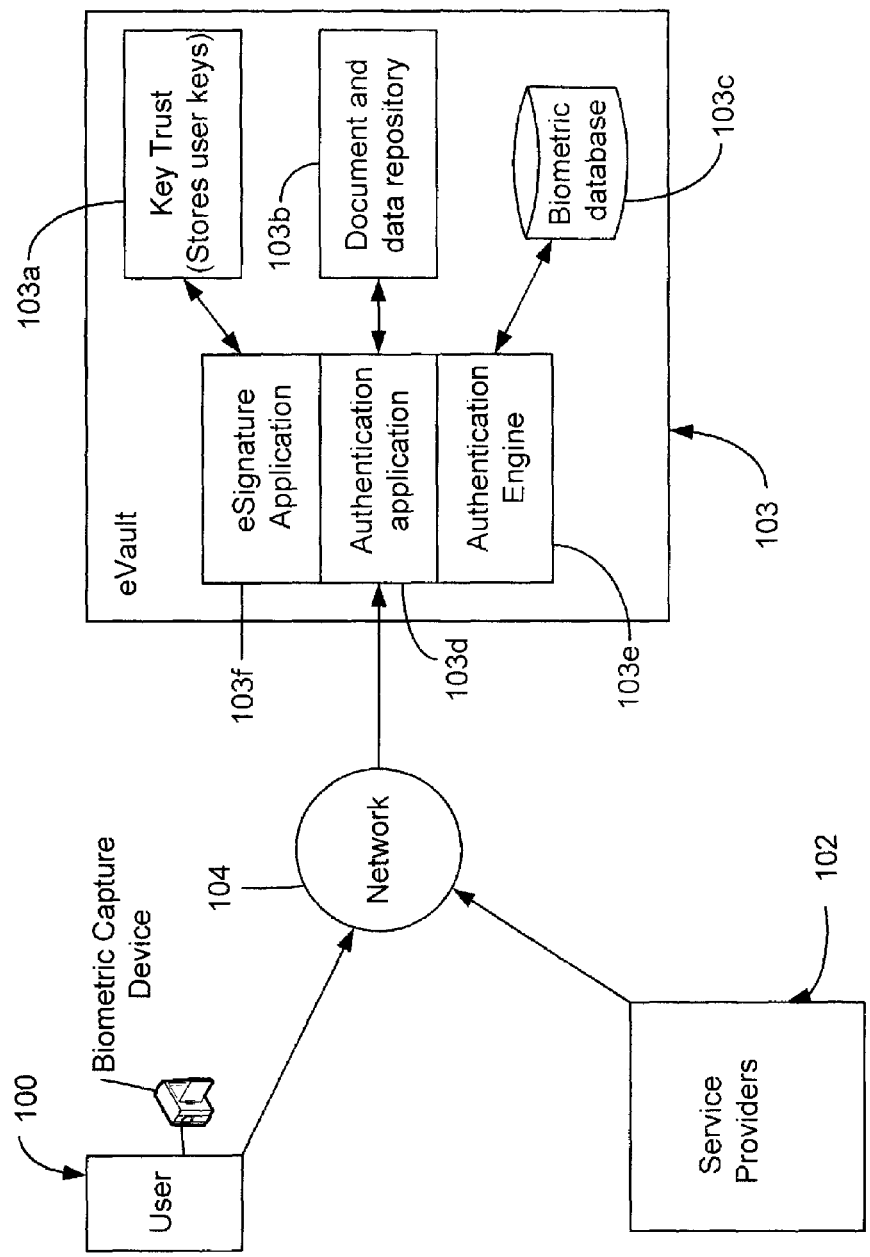
FIG. 3 is a schematic overview illustrating an eVault architecture according to the present invention.

FIG. 3 shows a schematic of a network architecture that may be implemented using an eVault of the present invention. A user 100 and/or a service provider 102 may connect over a network 104 to an electronic vault (eVault) 103 as provided for by the present invention. The eVault is adapted to provide an interface to a key trust 103a which stores a user's cryptographic keys, a document and data repository 103b wherein personal data or documents for that user may be stored and a biometric database 103c which provides a storage location for one or more biometrics associated with that user. Interface to these repositories is provided upon authentication of the user, which may be provided by an authentication application 103d, an authentication engine 103e and an eSignature application 103f. The authentication application provides an interface to the engine, and may be provided with a policy management component. It will be appreciated that the authentication application could be incorporated within the engine such that all functionality was effected therein. Although all components are shown co-resident with one another, it will be appreciated by those skilled in the art that the eVault may be provided in a distributed architecture such that one or more components may be linkable to each other via a network or similar connection node.

Figure 4:
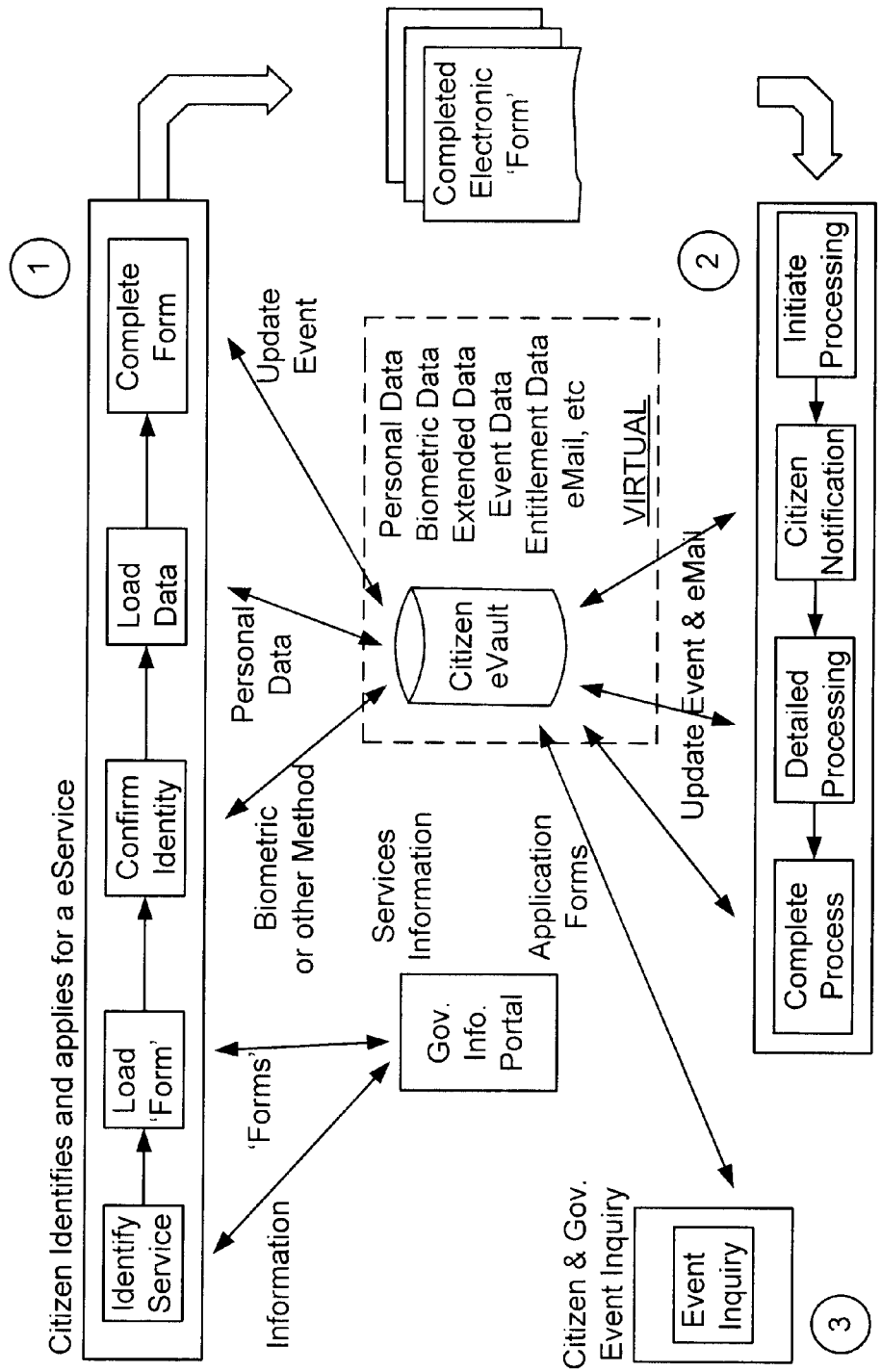
FIG. 4 is a flow diagram illustrating a citizen eVault for storing documents and information and provision of services using the documents.
Figure 5:
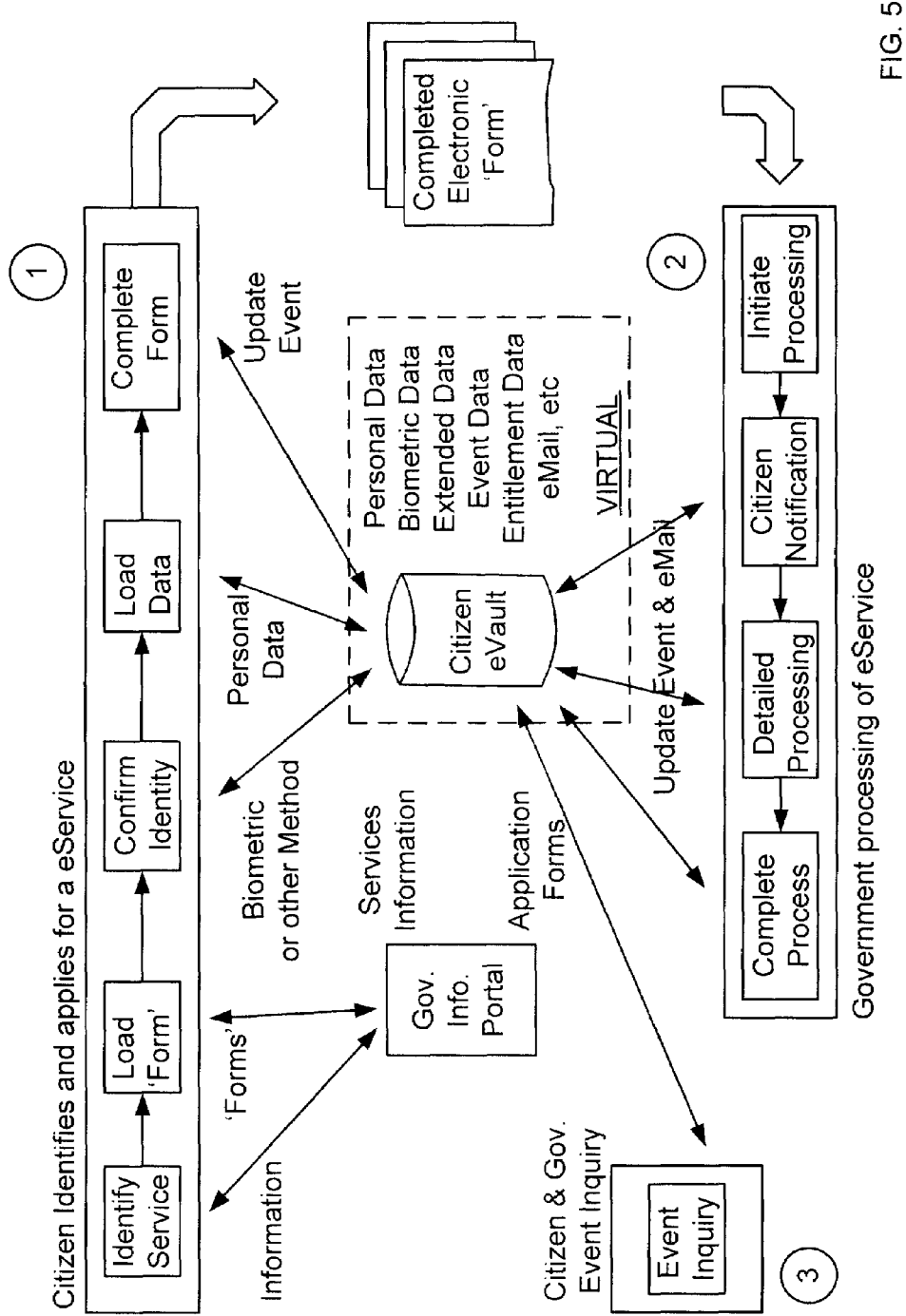
FIG. 5 is a diagram illustrating the eVault of FIG. 4 in more detail.

FIG. 4 shows an overview of an implementation of an eVault service delivery model. As this diagram illustrates, the processes 1) of identifying and applying for services and, 2) of Government processing of the services both involve accesses to the eVault. The former processes also involve access to the Government portals. As illustrated in FIG. 5 the eVault may be adapted to provide databases for:

Citizen core data/documents,
Citizen private sector digital documents, and
Citizen certified data from Government; digital documents such as driving licence or passport for example The private sector documents can relate to matters such as car insurance, house insurance, health insurance, asset contracts and membership subscriptions. The Government documents relate to matters such as vehicle registration, Value Added Tax (VAT), and academic qualifications.

Access control for the eVault is achieved by use of biometrics. A user's biometric is securely sent to an authentication engine component, where upon a successful biometric match, the user is granted access to their e-vault and all the services therein. The citizen does not need any tokens or codes and security is assured because of the irrefutable nature of biometric verification. In addition, the system can support access to a limited subset of data via the use of tokens, pins and passwords.

Figure 6:
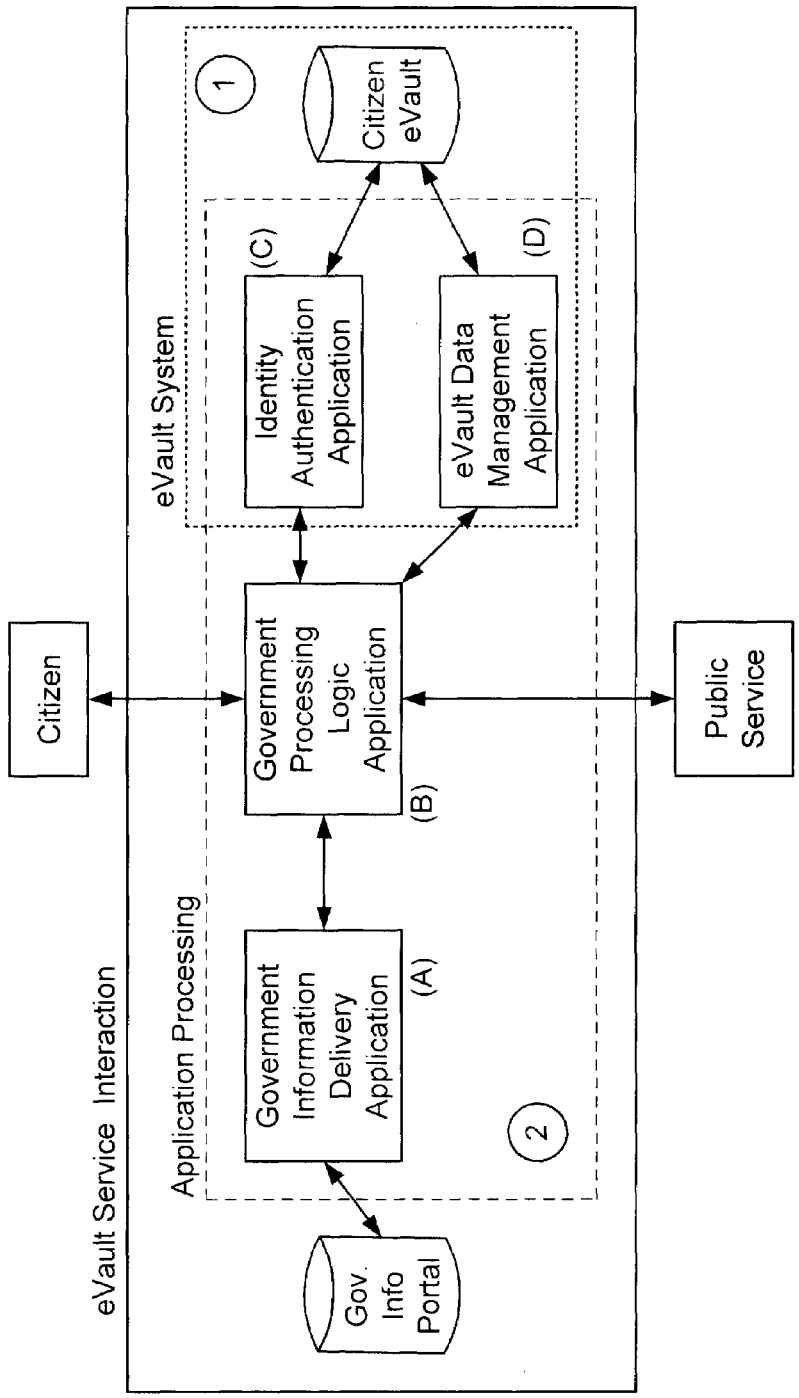
FIG. 6 is a high-level block diagram illustrating an application processing system.

As shown in FIG. 6, in addition to the databases the eVault comprises an identity authentication application C, also termed the authentication engine, and a data management system D. C and D may interface with Government applications B, which in turn interface with Government delivery applications A. The combination of the eVault and the applications are together referred to as "eGov Process". There is both citizen and public service interfacing with the eGov Process (via applications B).

Figure 7:
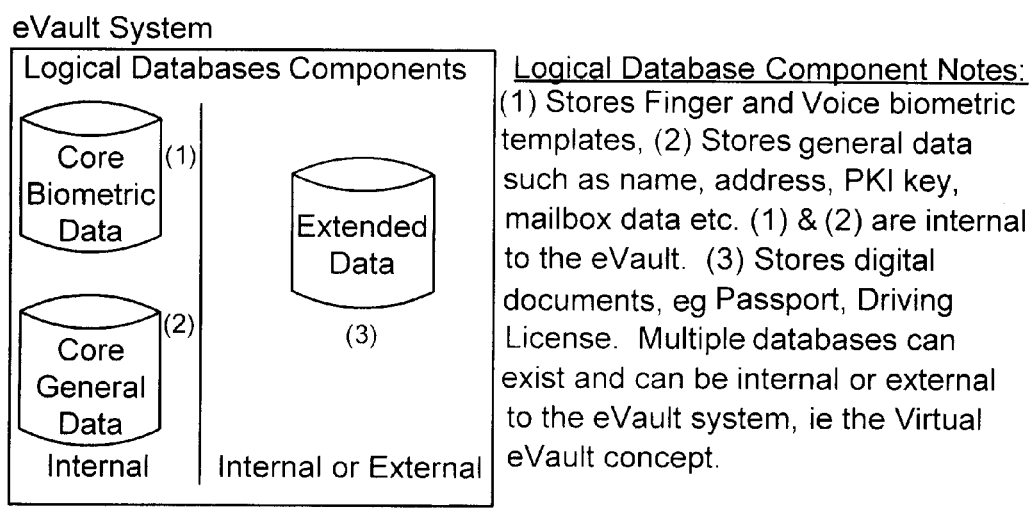
FIG. 7 is a diagram illustrating logical database components of the eVault.

The eVault does not necessarily store citizen data in a single physical location. Referring to FIG. 7, the eVault has a highly scalable secure database platform, which can accommodate various categories of data, including multiple biometric identifiers (voice and fingerprint), basic and extended citizen information in a form of 'virtual' database. Some components of data are stored outside of the basic database as 'extended' data. For example, as shown in FIG. 7 the databases can be configured as internal, i.e. localised with the eVault, or external, i.e. accessible via the eVault but not co-resident with the vault. This distribution is done in a manner providing controlled access so that it is the equivalent to being stored centrally. Portions of a user's logical eVault data may be held and maintained by an independent third party service provider. Typical data that would be stored locally would include the core biometric data relevant to the user such as the registered or recorded biometric identifiers and also the cryptographic keys associated with that user. The externally stored data is data or documents, which are personal to the user but not of a highly critical nature such as digital documents related to passport, driving licence and the like.

The eVault is a highly secure, biometrically enabled, citizen centric, intelligent data vault. Various categories of data stored in the eVault include; personal information (name, address, PKI keys, other cryptographic keys, all forms of personal data etc.), electronic documents (passport, driving licence, car insurance certificate etc.) and a secure mailbox entitlements. Biometric authentication of the citizen is required to securely access all data contained in the eVault. Depending on the access channel one or more different biometric types may be employed. For example, over a telephone line voice biometrics may be the most convenient, and the user's evault data will be tailored for that specific delivery channel. The eVault can supply personal information to other external systems based on a positive biometric authentication. In addition, the eVault will facilitate access to selected items of information via the use of tokens, pin and passwords.

The biometric technology provides a reliable, convenient and secure method to confirm personal identity using something that is uniquely part of every citizen. Current biometric solutions are classified as providing either identification or verification. Identification refers to one to many matching of biometric templates. Verification refers to one to one matching. The term authentication is used to refer to either biometric identification or verification. In a preferred embodiment, the eVault authenticates the citizen principally using voice and finger biometrics, although other biometric types may be found more suitable for differing applications.

The eVault is a multi-modal biometric authentication platform, which is capable of scaling to a global level. Biometric identification and verification are provided for enrolment and identity verification respectively. The identification process (one to many matching of all biometric templates stored in the database) is designed so as to provide an automated response to the matching request. While one-to-many matching may be performed to prevent duplicate enrolments, it is not mandatory and may not be executed within systems that allow a single individual to enrol under multiple identities.

The eVault allows one to enrol on one biometric device, but to be authenticated on one of many biometric devices, capable of reading a biometric type that has been previously enrolled. This provides inter-operability of biometric devices. The system further provides for the enrolment of a subsequent user by a user who has already been authenticated by means of a biometric.

The eVault provides functionality to:

Perform a biometric authentication process prior to all requests to access (to view/add/update/delete/sign etc.) all the citizen data contained in the eVault;

Provide secure Internet logon using finger scan or other biometric type access to all data stored in the 'core general' and 'extended' database components;

Provide secure voice print logon access to selected components of the core general database; and Supply specific items of data securely from the eVault to external systems based on a positive authentication of the citizen subsequent to the data request from other external systems.

For user access, the eVault:

Enables the citizen to access the eVault content using a multiplicity of delivery channels such as Internet, TV, mobile protocols (e.g. WAP, iMode), as well as more traditional standard personal computer (PC) access or telephone. PC access to the eVault will typically use the Internet platform and a finger scan device attached to the PC, although other interface systems may be found more practical;

Selects end user devices compatible with the proprietary biometric algorithms; and Ensures interoperability across a number of biometric hardware devices.

The following are additional features of the eVault:

Authentication of the user/consumer to a very high level of probability;

Protect the identity of the user/consumer to a high level;

Ensuring confidentiality and integrity of the transaction by integrating biometric authentication together with PKI and digital certificate;

Employ a database to monitor and track the biometrically enabled transaction together with PKI to ensure audibility and an audit trace that can only occur with the absolute consent and deliberate action by the end user/consumer, through the provision of their biometrics and other personal information;

Providing a trading platform to exchange/trade content to enable an electronic transaction such as renewal of motorcar tax; and Enabling a highly scalable architecture that could provide a global biometrically enabled e-vault.

In one embodiment the eVault is built using the principles and standards of the Java 2 Enterprise Edition (J2EE) architecture. The specifications and models for operation for this architecture are published by Sun Microsystems. It is noted, and will be appreciated by those skilled in the art, that it is possible to use many other known implementation languages and architectures to provide the functionality and architecture of the present invention, and J2EE is used as an example only.

The majority of digital documents and digital content data stored in the eVault and exchanged through the eVault are in an XML format. XML is a subset of the Standard Generalised Mark-up Language (SGML), which is an international standard (ISO 8879). Control of the XML standard rests with the World Wide Web Consortium (www.w3c.org).

Each section of a typical eVault architecture is described below with reference to FIG. 8.

Citizen Channels (800)

These are the channels through which the citizen using client software directly communicates with the eVault. For example, the citizen may use a telephone to communicate with the telephony channel and a web browser with additional plug-in to communicate with the web channel. The citizen channel is provided at the client side with a biometric reader so as to enable the capture of the biometric claim being presented by the citizen. The citizen can access the eVault from any PC with a web browser such as a home PC, Internet café, public library etc. From the web browser the citizen can view the information in the eVault, update it, if applicable, and even securely upload documents to or download documents from the eVault. Once the citizen has accessed the eVault, all communication is via a secure channel such as the Secure Sockets Layer (SSL), which ensures the complete security of the information transfer between the eVault and the citizen. In this format SSL provides confidentiality and integrity of the information passed between the citizen and the eVault. However it does not provide authentication of the citizen. It only provides authentication of the eVault. The citizen is authenticated to the eVault using biometric authentication. The citizen enters an identifier, unique within the eVault, and either a finger scan and/or a voiceprint or some other biometric identifier. The identifier and the biometric are combined into a biometric authentication request, which is be passed to the biometric subsystem which incorporates an Authentication Engine for authentication within the evault architecture. If the authentication request is verified, the citizen is granted access to the eVault.

Since access to the eVault is typically implemented using standard protocols such as HTTP or HTTPS, there are fewer restrictions on the use of this eVault by citizens operating within controlled environments such as corporate networks etc.

If the citizen channel utilised is one such as a voice channel, the citizen can review and update information in the eVault using interactive voice response, voice recognition and authentication. It is possible for the citizen to issue commands to accept documents into the eVault or to have certain documents or sections of documents within the eVault read back to the citizen. Since the citizen uses a dedicated telephone line during communication with the eVault, security of the information is ensured. The telephone channel provides the citizen with the most ubiquitous access channel possible to the eVault.

It is also possible in some implementations of an evault architecture to enable third parties access to documents or data specifically related to one or more users. Such third parties may typically be of the type "service providers" or "administrators". The third party may directly request the data from the eVault, or the eVault may automatically push the data to specific third parties, when it is updated within the eVault.

Service Provider Systems (805)

Service providers are those organisations both governmental and commercial, which provide services to citizens. Many of these service providers when dealing with a citizen will use the citizen's eVault to retrieve information about or store information for the citizen. FIG. 8 shows just two examples of service providers but it will be appreciated that many such organisations may be provided with access to an eVault.

The service provider may make two requests of the eVault: to deposit documents or data within the eVault, or to access documents or data from the eVault about a citizen.

Information Retrieval

Any request from a service provider to retrieve documents or data from the eVault of a citizen will only be honoured by the eVault if authorised by the citizen. This can be done over a number of different channels but the principle is the same irrespective of the channel—the citizen must make a deliberate and conscious act to facilitate the movement of information from the eVault. A policy management system provides functionality to tailor, configure, and set defaults for the release of user data to service providers.

From a technical perspective each retrieval request from a service provider is typically formulated as an XML document delivered over HTTP through the web channel of the eVault. These XML requests will contain an authorisation sub element. This sub element contains the information pertaining to the citizen authentication such as the citizen identifier, the biometric type (finger, voice etc.) and the biometric identifier. The XML request also contains a sub element for the digital signature of the service provider. In this way the requests with the digital signatures act as an audit log for non-repudiation. While a user biometric identifier may be collected and submitted through a service provider in this way, depending on the access rights afforded to a specific service provider, its presence is not mandated.

Information Depositing

Any request from a service provider to store documents or data from the eVault of a citizen will only be honoured by the eVault if its source can be verified, and optionally if the data or document can be validated. The citizen must also agree to the document or data being stored in the eVault.

Validation is done by comparing the document to be stored, to the template of the document and its associated rules. This ensures that the documents deposited by Service Providers are valid and correct.

Verification of the source ensures that the document has come from an appropriate Service Provider and only that Service Provider. Certain Service Providers will be authorised to produce certain specified documents and the eVault only accepts documents for a citizen from appropriate Service Providers. This ensures that the documents deposited by Service Providers are appropriate to that Service Provider i.e. a video store may not deposit a driver's licence in the eVault of a citizen.

Each deposit request from a service provider is desirably formulated as an XML document delivered over HTTP to the eVault. These XML requests contain two identification sub elements. The first element identifies the Service Provider who is depositing the data or document. The second identification sub element identifies the citizen for whose eVault the information is destined. The XML request also contains a sub element for the digital signature of the document by the service provider. In this way the requests with their digital signatures act as an audit log for non-repudiation.

Securing Requests to eVault

All communication between the eVault and the service providers preserves all aspects of security: authentication, integrity, confidentiality and non-repudiation:

Authentication:
The service provider from whom the request is sent must be identified as the only service provider from whom the request could have been sent. Likewise the response from the eVault must be identified as the only source of the response.

Integrity:
The request and response must not have been altered during transmission and it must be possible to prove that no such alteration has taken place.

Confidentiality:
It must not be possible for an eavesdropper to view the contents of the request from the service provider or the response to the request from the eVault.

Non-Repudiation:
It must not be possible for the service provider to disclaim sending the request at some point after it has been sent. Likewise it must not be possible for eVault to disclaim sending the response.

The eVault architecture comprises two principal mechanisms to ensure the security of the requests and responses:—

All XML requests submitted to the eVault are passed over secure protocol channels such as HTTPS. HTTPS is the Hyper Text Transfer Protocol over Secure Sockets Layer (SSL). SSL uses a combination of asymmetric and symmetric encryption, which provides integrity, authentication and confidentiality. SSL does not allow each request and response to be captured in a manner where it can be used for non-repudiation. However, using SSL improves the performance of the system especially with long documents or high volumes of requests from the same service provider compared with a mechanism to individually encrypt each document.

Each service provider request and response is digitally signed in order to support a non-repudiation audit log.

Web Channel Subsystem 815

This channel services all Hyper Text Transfer Protocol (HTTP) requests, to the eVault. There are three clients who may make requests through this channel; Service Providers, citizens and the eVault managers and administrators. This system will accept, interpret and formulate responses to these HTTP requests.

The J2EE architecture defines two separate but related components in this subsystem. The first is the web server, which manages the low level communications with the clients, delivers static web pages and passes dynamic requests from the clients to and deliver responses from, the second component, the Servlet engine. Servlets are programs, which extend the behaviour of the web server. They run within a defined environment, the Servlet engine, which provides them with a well-defined interface to the web server. Servlets and their associated programs, Java Server Pages (JSP), may be used to customise the behaviour of the web tier for the eVault.

Telephone Channel Subsystem 820

The channel services all telephony requests to the eVault. There is only one client who may make requests through this channel, the citizen. This system will accept, interpret and formulate responses to these telephone based requests. The telephone channel will act as an Interactive Voice Response (IVR) system but will use voice recognition software to translate the voice requests of the citizen to electronic requests which can be satisfied by the business logic subsystem. The electronic responses from the business logic subsystem are finally translated to a voice response to the citizen. Using voice recognition and authentication instead of tone dialing and PIN identification will make for a much more positive experience for the citizen.

eVault Administration Subsystem 810

All administration and management of the eVault is typically done through the web channel over a web browser. Once the administrator has authenticated to the eVault, all communication is via the Secure Sockets Layer (SSL) protocol. As with the citizen access through the web channel, administrators will be biometrically authenticated before being given access to the system. Administrative functions will include such processes as enrolment and citizen support.

eVault Business Logic Subsystem 825

This is the heart of the eVault's business processing. It manages the business processes through which the citizens, service providers and administrators interact with the eVault. All the behaviour related to document management, document requests, document signing, eVault administration etc. is performed in this subsystem. All interactions between the different enterprise information systems are co-ordinated by the business processes within this subsystem.

The telephony and web channels accept the requests from the clients, translate these requests to a common electronic format and pass them to the business logic subsystem for processing. The business logic subsystem then co-ordinates activity between the different Enterprise Information Systems such as the biometric subsystem, the data store and the external document stores to satisfy the request. Once the request is returned to the channels, it is translated into the appropriate medium of the channel and requestor i.e. voice replay, HTML or XML.

This design implies that the business logic subsystem is independent of the source of the request. When new channels are added, such as mobile or email, the business logic can continue to operate without change.

Biometric Subsystem 830

The biometric subsystem is represented as a single logic block, which contains all the elements required for the biometric processes of enrolment and authentication.

Enrolment

This is the most fundamental process in the operation of a biometric system and is implemented using an Authentication Engine. Much of the accuracy and performance of subsequent biometric requests depend on the enrolment process and system. During enrolment, the citizen's identity is associated with a number of biometric samples captured from the citizen.

The enrolment process may optionally include a uniqueness check. This determines if the citizen has already an allocated eVault. This prevents the citizen from inadvertently having two or more eVaults. The uniqueness check requires the biometric identifier, created from the sample from the citizen, being compared with all other biometric identifiers in the system. This is termed a "one to many match" and is one of the most time-consuming and functionally complex processes within the biometric subsystem. Enrolment takes place in trusted third party centres.

Authentication

The citizen presents himself/herself to the Service Provider or other enrolment application. During the authentication process, the citizen makes a claim as to his/her identity and supplies a biometric sample. The matching process will compare the supplied biometric identifier with the biometric identifier captured during enrolment. Multi-modal biometrics will allow multiple biometrics i.e. the finger and the voice to be used together or as a substitute for one another during the authentication process. The use of multi-modal biometrics will depend on the security and convenience requirements of the system.

This Biometric Subsystem conceptually forms part of the J2EE Enterprise Information System Tier. The actual technology used will depend on the choice of biometric modality being implemented.

Logical & Physical Document and Data Store

The eVault stores documents and data both physically and virtually. Physical storage refers to the actual data and documents being stored on the disks of the eVault using a document repository 835. This information is under the direct control of the eVault. The birth certificate of the citizen may be an example of a document held physically within the eVault. It is a document produced by a government body but would be held by the citizen in the eVault and it never changes or is updated.

Virtual storage refers to the actual data and documents being stored external to the eVault in one or more external document stores 840. This information is not under the direct control of the eVault but is accessed through the eVault. To the citizen there is little distinction between documents stored physically and virtually in the eVault. If the citizen attempts to access a document stored virtually, then the eVault will communicate with the external system holding the document and request the document on behalf of the citizen. An example of a document being stored in the virtual vault might be a passport. The electronic passport document will continue to reside in the government system but the citizen may view it through his/her eVault.

External Document Accessors Subsystem 840

The previous section explained the concept of the virtual document store where the documents are not stored physically within the eVault. This subsystem and its document accessors are the mechanisms by which the virtual store is implemented. The accessors of the eVault are the technical gateways through which the eVault will request documents and data from the external systems. These external systems behave as external document and data stores for the eVault, however communication to these external systems requires more complex processing than accessing documents within the internal document store. There may be a number of different types of external systems to which the eVault will communicate. Each may require a different accessor.

Figure 8:
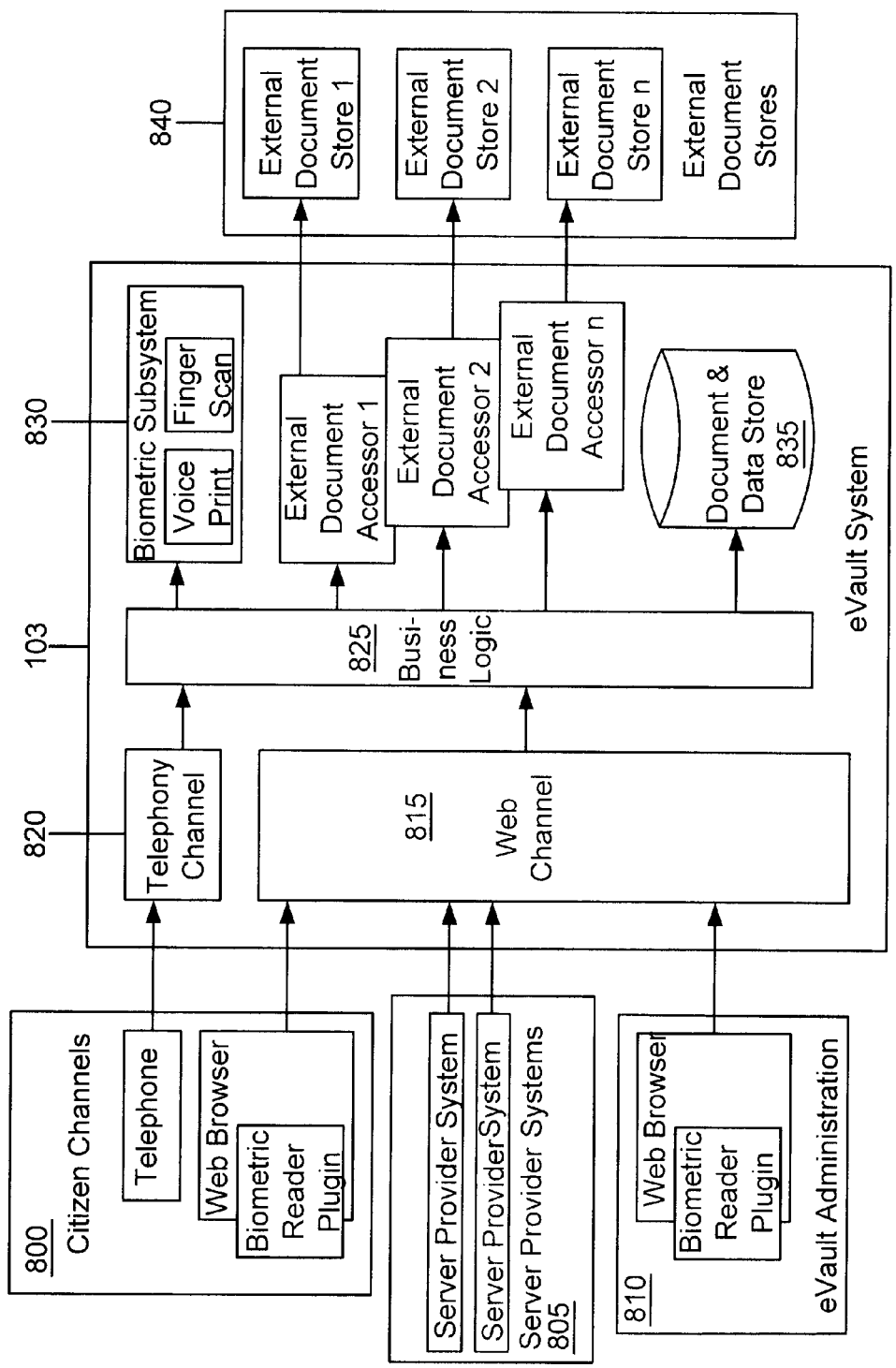
FIG. 8 is an eVault architecture diagram.

FIG. 8 shows just three examples of external document stores but it will be appreciated by those skilled in the art that these are exemplary of the implementation of the architecture of the present invention and it is not intended to limit the present invention to any such implementation.

Requests for information from the external document stores will have the same requirements for security as requests from service providers to the eVault itself. The communications channels through which the information will be exchanged must be secured and each party must identify themselves in order for the exchange to take place.

Figure 9:
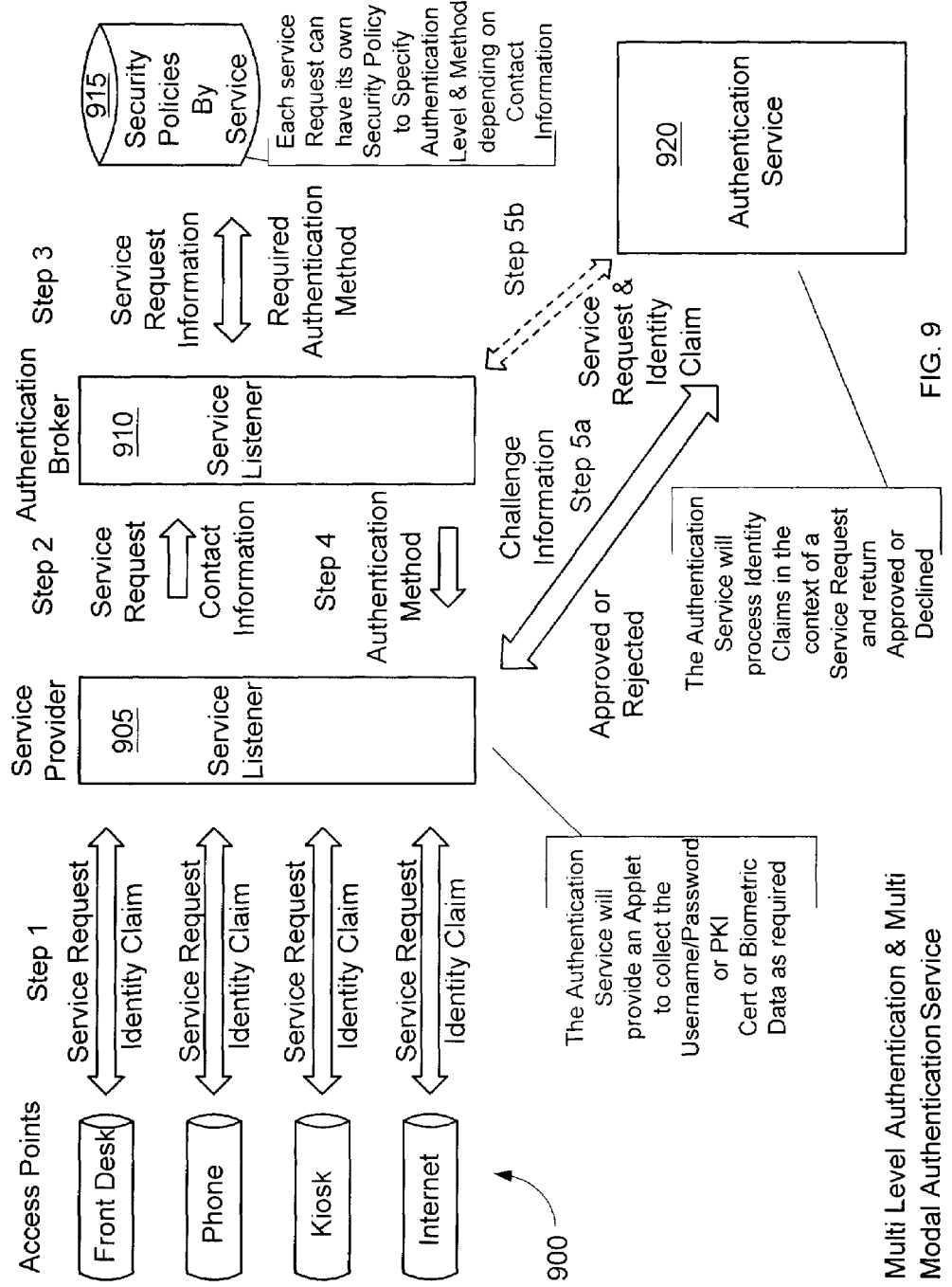
FIG. 9 shows components, access channels, and transaction flows that take place between a user, a service provider and an authentication engine.
Figure 10:
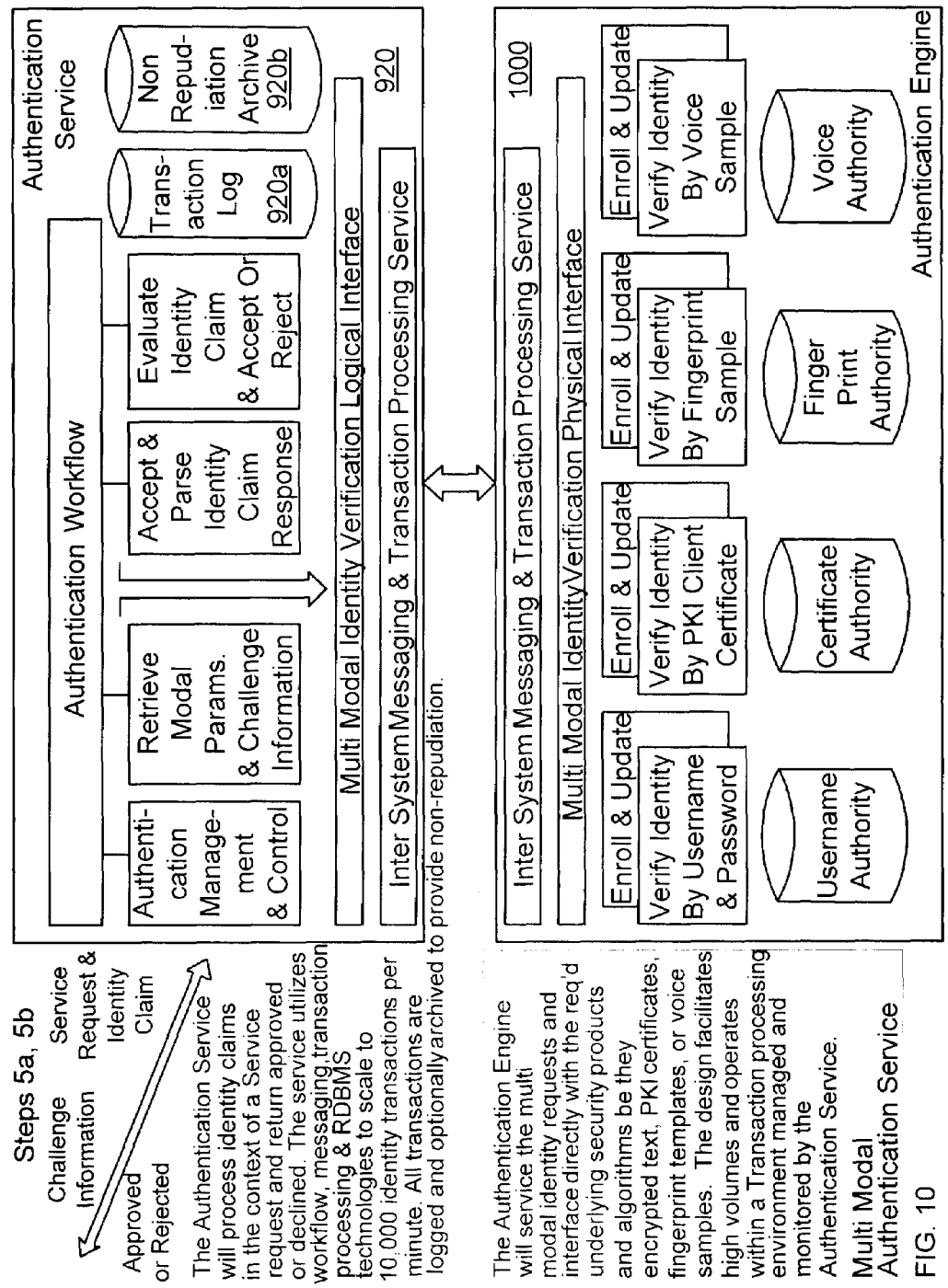
FIG. 10 shows components and workflow within a biometrically-enabled authentication engine and associated authentication service.
Figure 11:
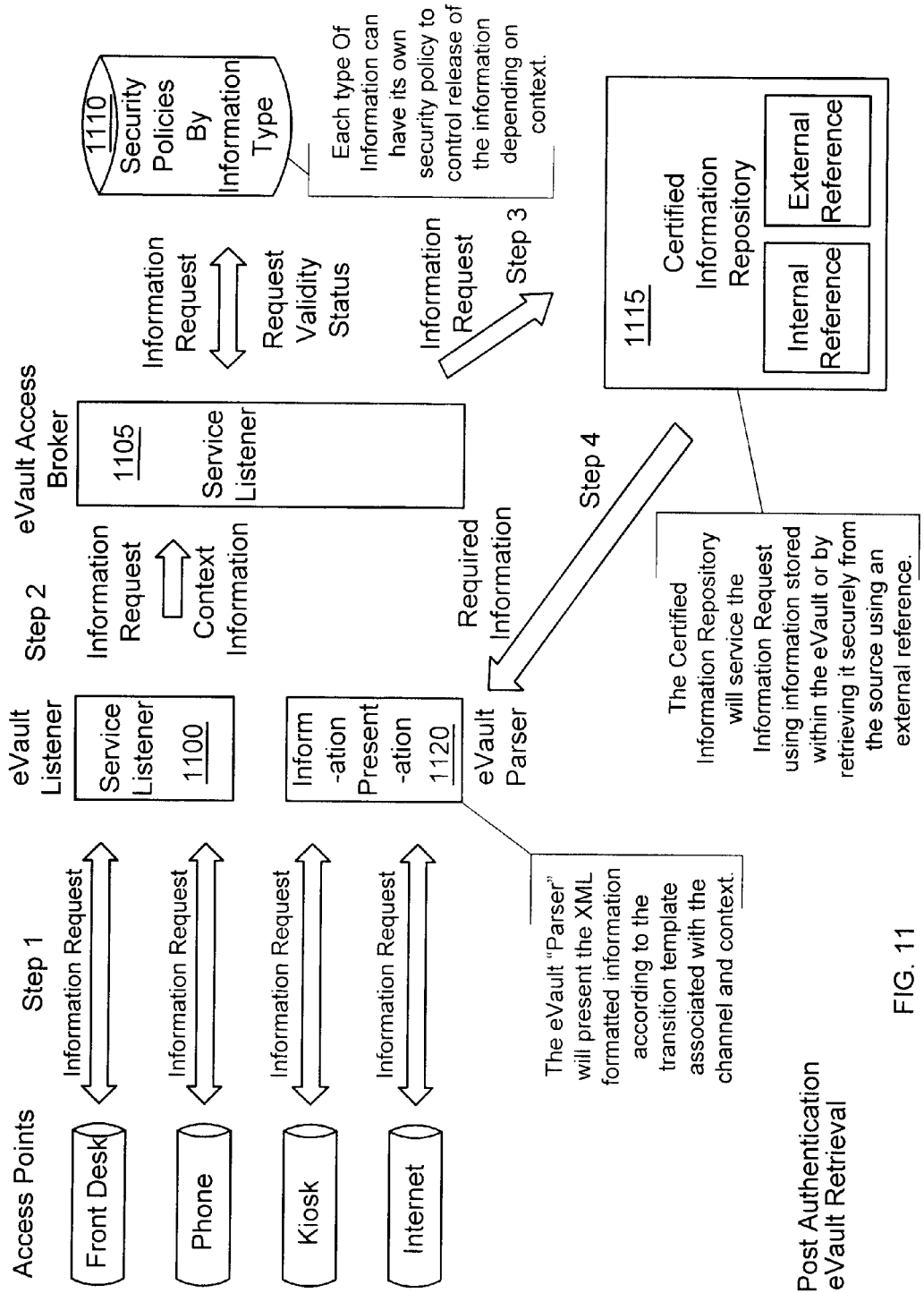
FIG. 11 shows components, access channels, and transaction flows that take place between a user, an eVault, and an authentication engine, when the user authenticates to their personal eVault and requests a data processing transaction.

Referring to FIG. 9 to 11, which describe a possible implementation of the authentication engine, channels into it, and the use of policies associated with each service instance to define the biometric (or other) confidence required for that service. The system provides an authentication service utilising multi level authentication based on multi modal authentication methods. In the example of FIG. 9 a user may interface with a service provider of the system via four access points 900 (Step 1). The request includes a claim of identity, wherein the user asserts an identity, and a service request. The service provider may be the same logical entity as the engine itself. A service request security policy database maintains the permitted contexts in which authentication will be provided, dictates the level of authentication required and has the associated methods by which a Claim Of Identity will be sought and satisfied. On receipt of the service request, the service provider forwards the service request and context information to an authentication broker 910 (Step 2). This service request is then compared against a security policy datastore 915 to obtain the required authentication method (Step 4). Each service request may have its own security policy to specify authentication level and method depending on the context-information provided.

In a first embodiment the authentication broker, on receipt of the authentication method from the security policy datastore, may forward this to the service provider (Step 4) which then independently effects communication with an authentication service 920 (Step 5a). The Authentication Service will process the identity claim in the context of a service request and return an approval or denial of assertion. In a second embodiment the steps 4 and 5a are combined by enabling direct communication between the authentication broker 920 and Authentication Service 920 (Step 5b) such that the service provider 905 simply receives an authentication or denial of authentication back from the authentication broker. Once the user has been authenticated, he is then free to effect further communications with the eVault.

FIG. 10 shows the components and workflow within a biometrically enabled authentication engine and associated authentication service, which are utilised during authentication of a user. The authentication service parses and evaluates the initial authentication request within the context of a specific function or service request, before passing an identity claim and authentication data to an engine 1000 for verification. Although it is shown in the context of two distinct elements, it will be appreciated that the engine and service may be integrally formed within a single entity. The authentication service processes identity claims in the context of a service request and returns an approved or denied status. The Authentication Engine is adapted to service multi modal identity requests and interface directly with required underlying secure data, be they encrypted text, PKI certificates, biometric templates or the like. An engine provides for high volume transaction processing in an environment managed by the authentication service.

The service requests can therefore range from simple information requests to sensitive transactions and the authentication service will dynamically determine and present the request for the associated level of identity verification.

Two interpretations of this are possible:—
Present to me the available service functions that I can choose from according to the channel I am using (e.g. phone/internet/front desk) and the context (which eGovernment service provider or other service provider) appropriate to the authentication methods I currently have at my disposal on this channel.
I present the highest level of Claim Of Identity that I am able to using this channel and the authentication methods available and am presented with the available Service Functions I can choose from.

The Claim Of Identity can be satisfied by the following mechanisms:—
Username & Password/PIN.
Client PKI Digital Certificate.
Biometric Fingerprint.
Biometric Voice Sample.
Other biometric type or multi-modal biometric samples It will be appreciated that the illustrated mechanisms are exemplary and other mechanisms can be supported going forward and existing mechanisms may be combined to achieve the highest level of identity verification.

The Authentication Service will present the service provider with the mechanism to capture the Claim Of Identity from the citizen. This service needs to be capable of processing very large numbers of simultaneous authentication requests and is built along typical validation processing system lines using Transaction Processor, Messaging and RDBMS components.

The authentication service is designed to sit on top of the authentication engine. The authentication engine will encapsulate the various Claim Of Identity verification processes or sub-systems and present them using a uniform high level application programming interface. This will allow maximum scalability of authentication mechanisms and provide for the possible inclusion of additional authentication mechanisms in the future.

The eVault provides a framework and application architecture within which certified information can be securely received, stored, accessed and released under tightly controlled circumstances from a central repository. As shown in FIG. 11 this information is provided to the user once authentication has been effected.

A security policy database 1110 sets and controls the rules that the citizen has selected regarding access and release of Information Types and maintains the permitted contexts in which certified information will be provided.

An information request (Step 1) is made by the citizen and the service provider and received by the eVault Listener 1100 which asks the eVault Access Broker 1105 (Step 2) if the information can be made available according to the channel and context of the request and the current authentication level of the Citizen.

Assuming the clearance is given the information request is forwarded to the certified information repository retrieval agent 1115 (Step 3), which sources the information from within its physical storage or by brokering a request to the original source to provide the Information, on behalf of the citizen. The Information is typically provided to the Information Presentation agent 1120 in an XML format (Step 4), which is then parsed for presentation according to the channel that the citizen is using and the eGovernment service providers capabilities. For example the information may be parsed for presentation on an automatically completed web form or passed to a 'text-to-speech' service integrated with the IVR system in use.

FIG. 11 illustrates how the security architecture may be configured to safeguard the authentication and eVault services. This diagram presents the schematic within a security zones context.

The following summarises advantages and features of the invention.

The eVault enables the citizen to manage and securely store personal information and documents electronically through a single virtual database system. Biometric identifiers are stored in the eVault.

Access to the eVault (view/add/update/delete/send/sign) is via a secure biometric authentication process for all of the data and some items of data can be accessed via tokens, pins and passwords.

The eVault also provides a secure mailbox storage functionality. Some of the citizen data is certified. The citizen can store and access their private PKI key securely from the eVault, and can perform operations within the eVault using that key.

Workflow Processing Functionality

The eVault system provides workflow functionality. The eVault workflow system enables the completion of eService application forms online typically using the Internet as the delivery channel and using the eVault data store to provide information to the 'form' in an automated process, subsequent to a successful biometric authentication request.

The electronic 'forms' at a service provider outside the eVault, use a data definition and data identification capability to calculate which items of citizen data that the service provider will attempt to extract from the eVault data store to complete one or more of the forms. The eVault provides the items of data that it can, and also identifies back to the eService 'form', which items of data need be input manually.

General Processing Functionality

The eVault provides the ability of linking a citizen directly to electronic transactions using biometrics as the biometrics represents the citizen uniquely. The eVault protects the privacy of the citizen, by preventing access to the data by all parties other than the citizen, via the use of biometric technologies.

The eVault performs a biometric authentication prior to accessing any data contained in the system (personal information, documents, mailbox etc.). The eVault supplies citizen data to external systems based on a positive biometric authentication by the citizen. Based on user defined policies, tailored to specific service providers, such data may also be released.

The eVault provides the ability for secure communications to be enabled between the citizen and service providers, by allowing the citizen to store a personal PKI key in the eVault and which is easily accessed as required.

In order to improve the security of managed documents or data which are remotely stored from a user, the present invention provides for the association of a biometric identifier with a key or keys, typically a private and public key so as to effect more secure generation and association of electronic signatures with documents.

Although presented in the context of documents stored in a user's eVault, the electronic signatures protected by biometrics, may also be used to generate signatures on documents used and stored externally to the eVault.

Figure 12:
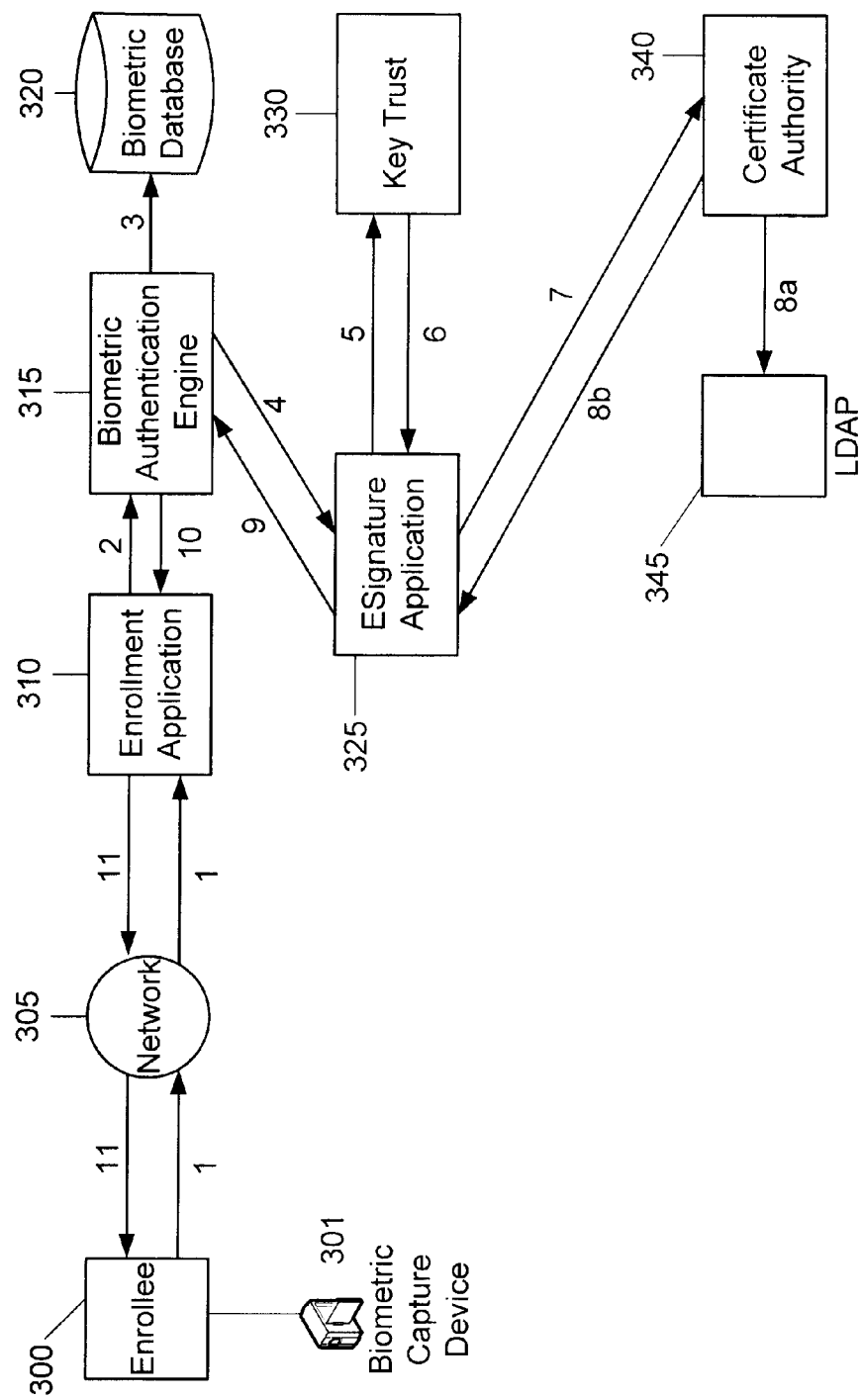
FIG. 12 shows an enrolment process for associating a biometric identifier with a key or keys according to the present invention.

An example of the enrolment process to an eVault of the present invention is shown in FIG. 12 wherein the following steps are identified. These steps are shown for illustrative purposes only and it will be appreciated that the skilled person will not limit the present invention to any exact replication of such steps.

Step 1, the person being enrolled (i.e., an enrollee 300) connects over a network 300 to an enrolment application 310 which as described previously is interfaceable to the eVault architecture. The connection to the network 305 typically involves the supply of a biometric sample to the system, the biometric sample being provided to the system by the enrolee 300 utilising a biometric capture device 301. It will be understood that the network can be a wide area, local area or even a personal area network.

Step 2, the enrolment application 310 captures enrolment data on the individual (for example, name, address, date of birth etc.). It will be appreciated that this enrolment data could be input on the basis of a prompt for specific information from the enrolment application and could be implemented over a locally installed application or for example using a web based server. This enrolment may also include one or more user identity claims. The amount and nature of this information can vary depending on the required information for the specific installation of the system and it will be understood that such information may vary depending on the installation environment where the system of the present invention is intended for use. On capture of the specific identifiers by the enrolment application, the captured samples are then forwarded to a biometric authentication engine 315 which may (depending on its configuration) carry out a uniqueness check on the biometric samples taken at enrolment. The uniqueness check will typically be implemented where the system is configured to only associate a single biometric identifier with a single user identifier whereas in other implementations a user may have two or more suitable user identifiers associated therewith, each user identifier being associated with the same biometric sample.

Step 3, if a user successfully enrols, their enrolment data including the biometric samples are stored in a persistent data store (shown as a biometric database 320) within the eVault associated with or defined for that user.

Step 4, based on data requested at step 2, an administrator decision or a configuration parameter, the enrolee 300 will be designated as one entitled to create electronic signatures.

Once designated, in Step 5, this results in a request being sent to an electronic signature application 325 to cause it to generate the necessary public and private keys. It will be appreciated that, using a system according to the present invention, a biometric identifier is used to identify a user of the system and to cause it to generate a key or keys for that user or to associate that user with a key or keys. Once these keys have been generated and associated with a biometric identifier they can then be accessed by presentation of the biometric identifier without any subsequent enrolment or alternative traditional access methodology.

The e-signature application requests a public-private key pair to be generated by a Key Trust 330. The Key Trust typically uses a HSM (Hardware Security Module) to generate this key. The HSM is a tamper-resistant device that contains cryptographic capabilities, and it will be appreciated that alternatives (such as a software implementation) that offer suitable equivalent capabilities may be equally applicable.

The request to the HSM is typically signed by the component generating the request (the e-signature Application 325). This signature may optionally include in the signing data the signature generated by the Authentication Engine 315 in step 4 when making the request of the e-signature application. The invention allows for and recognises a situation where all parties in the communication from the user to the key trust can sign (and optionally encrypt) messages. Each of these signatures can then be checked by the key trust before allowing the signature key or keys associated with the user to sign a document.

The HSM generates the keys and optionally exports the public key. In accordance with known principles, the private key is stored in a key store database within the key trust 330. Each private key stored in the database is encrypted or wrapped under a separate cryptographic key known only to (and stored on board) the HSM. Strong cryptographic techniques (e.g. AES, 3DES) should be used to encrypt the private keys.

Step 6, the HSM component of the Key Trust 330 exports the public key component to the e-signature Application 325.

Step 7, the received public key component is then forwarded together with the necessary registration/enrolment details to a Certificate Authority 340 for signing. It will be appreciated that a variety of methods can be used to export the key, including both off-line and on-line. A variety of protocols can also be used—for example, Public Key Cryptographic Standard number 10 (PKCS#10).

The Certificate Authority 340 then signs the public key using its private key. The resulting certificate can then be stored in a directory service—for example, an LDAP (Lightweight Directory Access Protocol) 345 compliant directory (step 8a).

Step 8b, a success (or failure) status dependant on the generation of the certificate is returned to the E-signature application 325. This status can be returned in an on-line or off-line mode depending on the CA configuration. In the case of a success status code, the digital certificate can also be returned if required. The certificate may be in X.509 format, amongst others.

In step 9, the E-signature application returns a success or failure code to the authentication engine 315. This status code, again, can be returned using an on-line or off-line protocol. Upon receipt of a successful status code, the authentication engine 315 registers that enrolee as enrolled for the E-signature application. The enrolment application and enrolee may optionally also be notified of the success/failure of the operation (through steps 10 and 11).

It will be appreciated that steps 7 through 8b are carried out where an external certificate authority is being used. The invention is also designed to work in a situation where the key-pair authenticity is self asserted or asserted by the key trust. In this case, the steps outlined above for interacting with an external CA are not required.

It will be appreciated that although above components of the system have been described with reference to discrete modules such as an Authentication Engine 315, this has been done for ease of explanation and that two or more applications could be implemented on the same hardware or software platforms. It will be further understood that the communication between the individual components could be effected over a local or wide area network.

Message Integrity

It will be appreciated that as the above described steps relate to the formation of a specific security identifier associated with a specific user that it is typical that secure communication protocols should be utilised such that all messages in the scheme (in particular messages identified in Steps 2, 4, 5, 6, 7, 8b, 9) have integrity guarantees in place. This could typically include a signing and/or an encryption of these messages by the originating parties, but it will be appreciated that alternative methodologies could be envisaged which require only some or none of techniques to be utilised.

Enrolment with Enroler Signature

It will be appreciated that the above flow steps outline a process for the generation of a digital certificate for a specific user that does not require any specific enroler signature. The present invention may provide in an alternative embodiment a variant to the process hereinbefore described wherein the enrolment data request is also biometrically signed by an enroler. This process is very similar to the simpler enrolment outlined above and can be seen in the FIG. 13. The same reference numerals will be used for similar components or process flow steps. In the eVault architecture the enroler will biometrically authenticate through their eVault when enrolling the new user. The enroler is a citizen, who already has a personal eVault associated with them and who has privileges allowing them to enrol other users. Part of the data stored during enrolment in a user's eVault will indicate who the enroler for that new citizen or user was. During the new enrolment, the enroler is authenticated against their own personal biometric identifier within the eVault to ascertain and confirm their correct identity prior to any access being obtained.

In this modification to the process flow outlined above, Steps 1 and 2 (the connection and submission of enrolment data) are broken into 2 parts (1a,b and 2a,b). Steps 1a and 2a are the same as in the configuration shown in FIG. 12. Step 1b involves an enroler 401 connecting to the enrolment application, which is typically on the same interface and network connection. The enroler is also usually in the same physical location as the enrolee, although it will be appreciated that alternative techniques such as using voice recognition may allow the enroler to be in a remote location to the enrolee, yet still be able to enrol the enrolee with the system. Step 2b involves the enroler 401 supplying a biometric sample and signing the enrolment request of the enrolee 300. This signature will then be included in the message payload to both the authentication engine and the e-signature application. It will be appreciated that this signature may be selected from one of a number of different signature types including those generated using a key of the enroler, a key of the server application or a key which is associated with a biometric identifier of the enroler.

One or both of these systems may then use a privilege management database to ensure that the enroler was entitled to enrol the enrolee, although it will be appreciated that it is not intended to limit the present invention to such hierarchical management systems.

Figure 13:
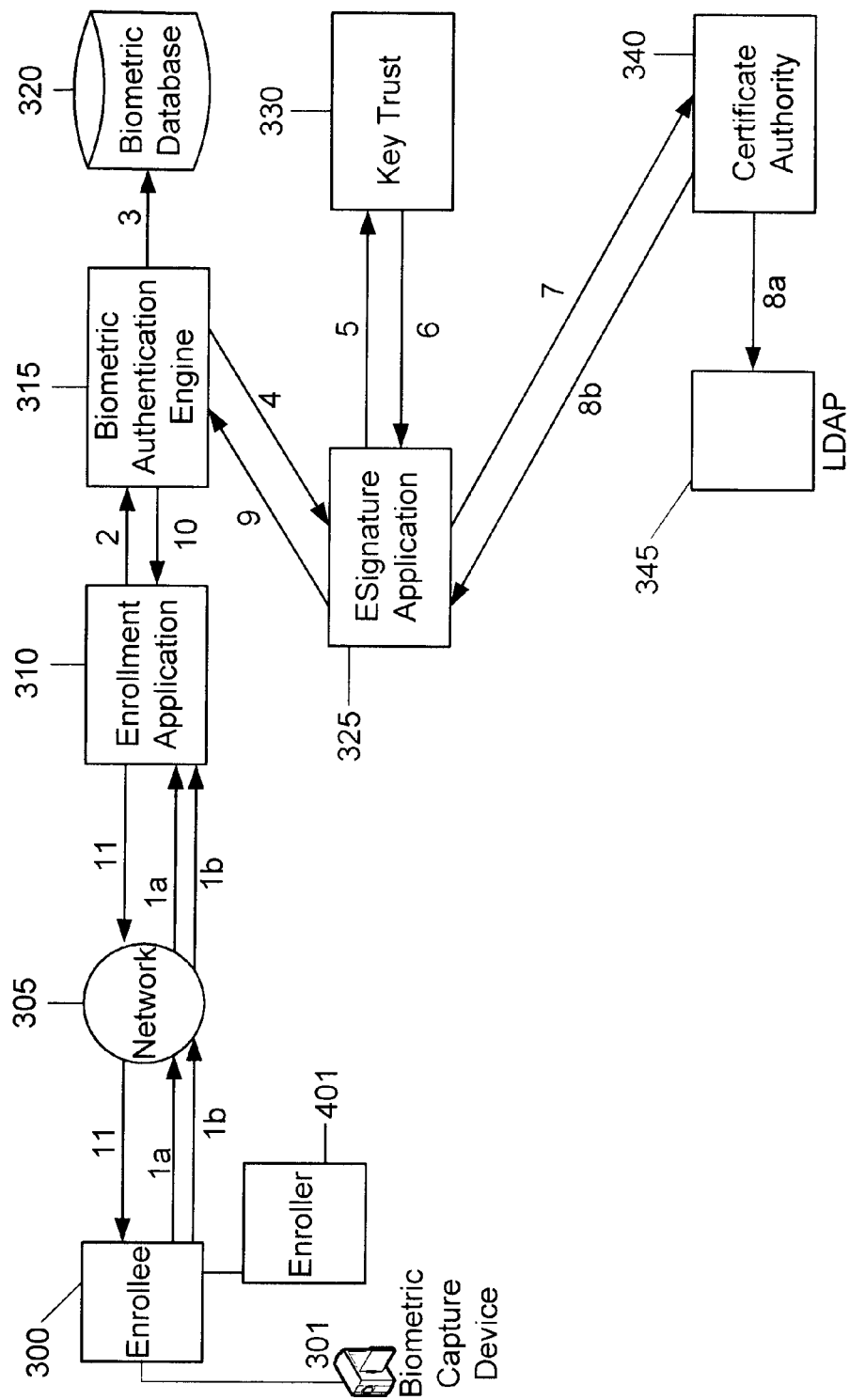
FIG. 13 is a modification to the enrolment process outlined in FIG. 12, in accordance with another aspect of the present invention.

It will be appreciated that in the enrolment process outlined in FIGS. 12 and 13 that typically a separate enrolment checking procedure is implemented in either the e-signature application 325 or the Authentication engine 315 to verify the accuracy of the enrolment prior to the generation and signing of the keys (steps 5 onwards). This is not shown in the diagram for simplicity, but will be appreciated by the skilled person as forming part of the invention.

Figure 14:
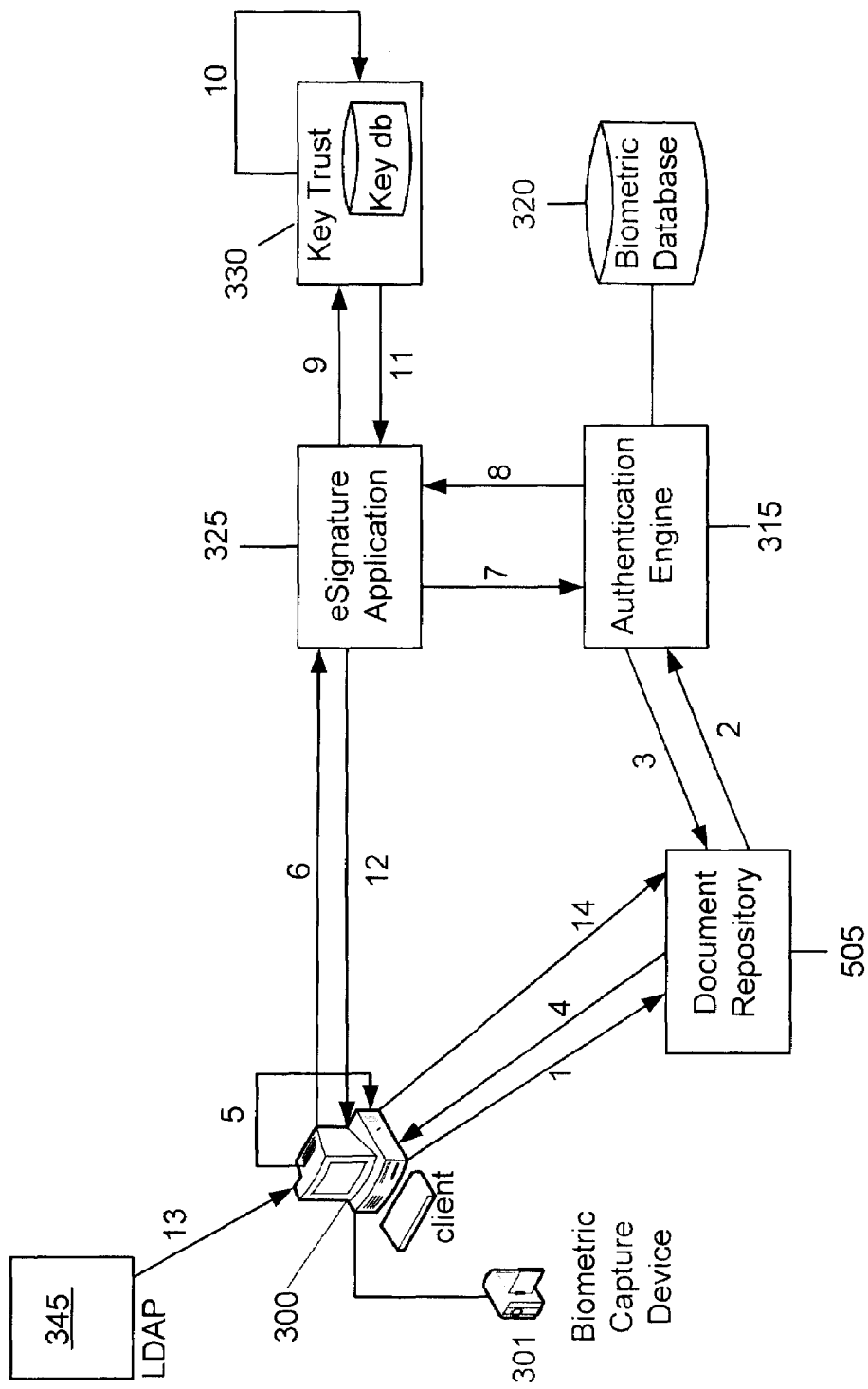
FIG. 14 outlines a generation process for the application of a biometrically protected electronic signature in accordance with the present invention.

Once an enrolee 300 has successfully enrolled in the eVault system of the present invention, he now adopts the persona of a client to the system and is now free to generate biometrically protected signatures for application to specific documents, and may be able to act as an enroler for additional persons or users (if so authorised). A typical generation process is shown in FIG. 14, and will be described with reference to a document repository (DR) as a partner application, although it will be appreciated that such an example is not intended to limit the present invention to interface only with document repositories. Again, the same reference numerals will be used to describe similar components to the system.

The following steps are followed to sign a document:

A client 300 connects to a document management engine or document repository 505 and provides an identity claim and a biometric sample (Step 1). The biometric sample is encrypted under a key known to the Authentication Engine (AE) 315 (e.g. the AE's public key). This ensures that the partner applications such as document repositories (DR) do not gain access to the biometric information.

Client→DR: claim, $E_{AE}$(biometric sample)

Optionally, to increase user privacy, the claim may be specific to the DR, and the mapping between the DR-specific claim and the user's AE claim may be encrypted along with the biometric sample, and only visible to the AE. This would prevent DRs colluding to compare claims. In addition, by including the claim (DR-specific or otherwise) encrypted with the biometric sample, a dishonest DR is prevented from attempting to find other claims, through repeated requests to the AE, that falsely match the submitted biometric sample.

The document repository 505 forwards the claim of identity and the biometric sample to the Authentication Engine 315 (Step 2). The message also includes an application identifier (id). This message may be signed by the document repository, which as shown in FIG. 3 is accessible or resident within the eVault architecture also.

DR→AE: claim, $E_{AE}$(biometric sample), application id

The Authentication Engine 315 verifies the identity of the user, using a biometric matching algorithm, and returns an authentication ticket to the partner application (document repository) 505 (Step 3). This is the user's claim of identity signed by the authentication engine. It typically includes a timestamp, expiry date and application id. This authentication ticket can be passed by the DR 505 to the client to streamline the authentication process to other applications and the AE later.

auth_ticket $:= S_{AE}$(claim, application id, timestamp, expiry date)

AE→DR: auth_ticket

The Document Repository 505 determines (based on the authentication success/failure) and its privilege management engine that the user is entitled to see the document and if this is the case, returns the document to the client 300 along with the authentication ticket (Step 4).

DR→Client: document, auth_ticket

It will be understood that the method of the present invention may utilise one of a number of methods for returning the authentication ticket to the client including but not limited to the use of cookies.

The auth ticket is ultimately used by the key trust KT 330 and may be optionally encrypted with the KT's public key to increase privacy of communications.

An identifier of the e-signature application may optionally be included in the ticket to prevent it being used by another entity.

The user may modify the document contents. The client calculates the digest (hash) for the document to be signed and encrypts under the public key of the KeyTrust (KT) 330 (Step 5).

enc_digest $:= E_{PUKT}$(digest)

It will be appreciated that an alternative implementation of this scheme could be built where symmetric key cryptography is used in some or all messages.

In Step 6 the Client forwards authentication ticket, encrypted digest to the e-signature Application 325(AE).

client→AE: auth_ticket, enc_digest

The e-signature Application 325 verifies the authentication ticket, previously issued by the authentication engine 315 in step 3. It may optionally go on-line to the authentication engine to do this (steps 7,8). Depending on its policy configuration, it may trust the authentication ticket at this point (it is signed by the AE) or it may request a re-authentication if a) it is configured to do so at each signing or b) the authentication ticket is no longer valid (for example, if the expiry period has elapsed).

It should be noted that should the ticket not be present or a re-authentication required, a formal authentication (biometric, claim) may be carried out by the e-signature application 325 using the authentication engine (AE)315.

Once the signer has been authenticated, the e-signature application 325 signs the authentication ticket and encrypted message digest. This is then forwarded to the Key Trust 330 (Step 9).

KT_ticket$:= S_{esignApp}$(auth_ticket, enc_digest)

eSignApp→KT: KT_ticket

The Key Trust 330 verifies the signature on the KT_ticket so as to ensure it came from a trusted e-signature application. It can then verify the authenticity of the authentication ticket (signed by the AE), decrypt the enc_digest to get the document digest for signing.

It will be appreciated by the skilled person that in most secure operations, all encryption and decryption operations will be carried out by the Key Trust HSM.

It then retrieves the private key from its database and decrypts it using the key corresponding to the claim signed by the AE (Step 10). This key could be symmetric or asymmetric and in the case of a symmetric key could be a single key used across all claims or a derived key—the derivation based on, for example, the claim of identity.

It will be appreciated by the skilled person that the provision of multiple signatures by the various trusted components within the process steps of the present invention adds to improvements in the overall security robustness of the system.

The KT 330 then signs the digest, possibly adding a timestamp if necessary. It will be appreciated that these timestamps may be server assigned timestamps and/or client assigned timestamps.

The Key Trust 330 then sends the resulting signature back to the e-signature application (Step 11)

The e-signature application 325 returns the electronic signature to the client 300 (Step 12)

It will be appreciated that the return of the electronic signature may include such optional steps as the validation of the signature using its own public key from a directory (e.g. LDAP 345)(Step 13) prior to execution of step 14, which is the storage of the electronic signature in the document repository 505.

Figure 15:
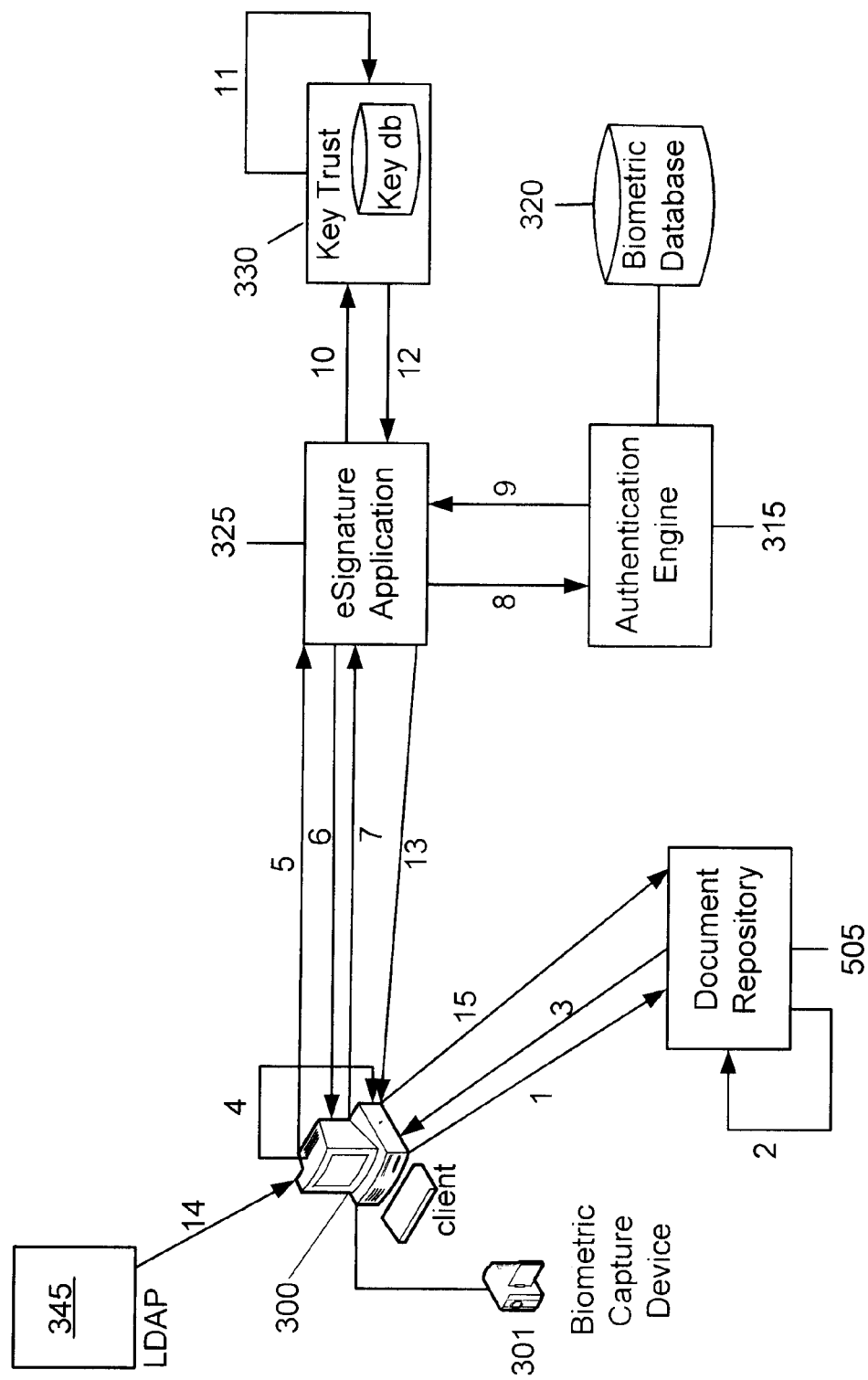
FIG. 15 shows a process flow for a system where the document repository is not fully integrated with the authentication engine in accordance with a modification to the present invention.

It will be appreciated that the process flow outlined above may be differentiated for situations or circumstances wherein the document repository 505 is not fully integrated with the Authentication Engine 315. Such a modification is outlined in FIG. 15. Again, as was utilised previously similar reference numerals will be used for equivalent components to the system. In this scenario, the flows are very similar, however the document repository has no direct link or association with the authentication engine. This scenario may exist in situations such as:

1. A customer or client has deployed the e-signature product with a document repository which has not yet been associated with the storage biometric identifiers; or
2. The e-signature signing service is a service offered over for example the internet, with no integration with local repositories.

In this case, the Document Repository has its own authentication mechanism (e.g. user name and password) for authenticating the user. This is shown in step 2. The document is returned to the client in step 3 and the digest (as in the previous scenario) is calculated in step 4. Step 5 is similar to that outline in Step 6 of FIG. 12 wherein the Client forwards the authentication ticket and encrypted digest to the e-signature Application 325(AE).

Steps 6 and 7 show the e-signature application determining that it does not have a valid authentication ticket. This may occur in situations where the biometric identifier has not yet been presented to the system or the ticket has expired. It then requests a biometric and claim and forwards these to the AE for authentication (steps 6, 7, 8, 9).

The operation of the AE including the data in the authentication ticket is as outlined previously.

It will be appreciated that in case of user identification, the claim is not present in data flows 7 or 8—but is determined by the AE and returned in data flow 9.

Steps 10 through 15 correspond with steps 9 through 14 in the previous (integrated document repository) scenario outlined in FIG. 14.

To verify an asymmetric signature, a verifier usually obtains the signer's digital certificate, and uses this to verify the signature. Where a Certificate Authority is not used, other methods to verify the signature can be applied. The verifier may request, through an optional arbitrator application, that the KT send the key material necessary to verify the signature directly to the verifier. In the case of asymmetric signatures this will be the public key corresponding to the private key that signed the document. Using traditional cryptographic techniques and protocols, the KT may securely send the key to the verifier, and prove that this key originated from the KT.

Figure 16:
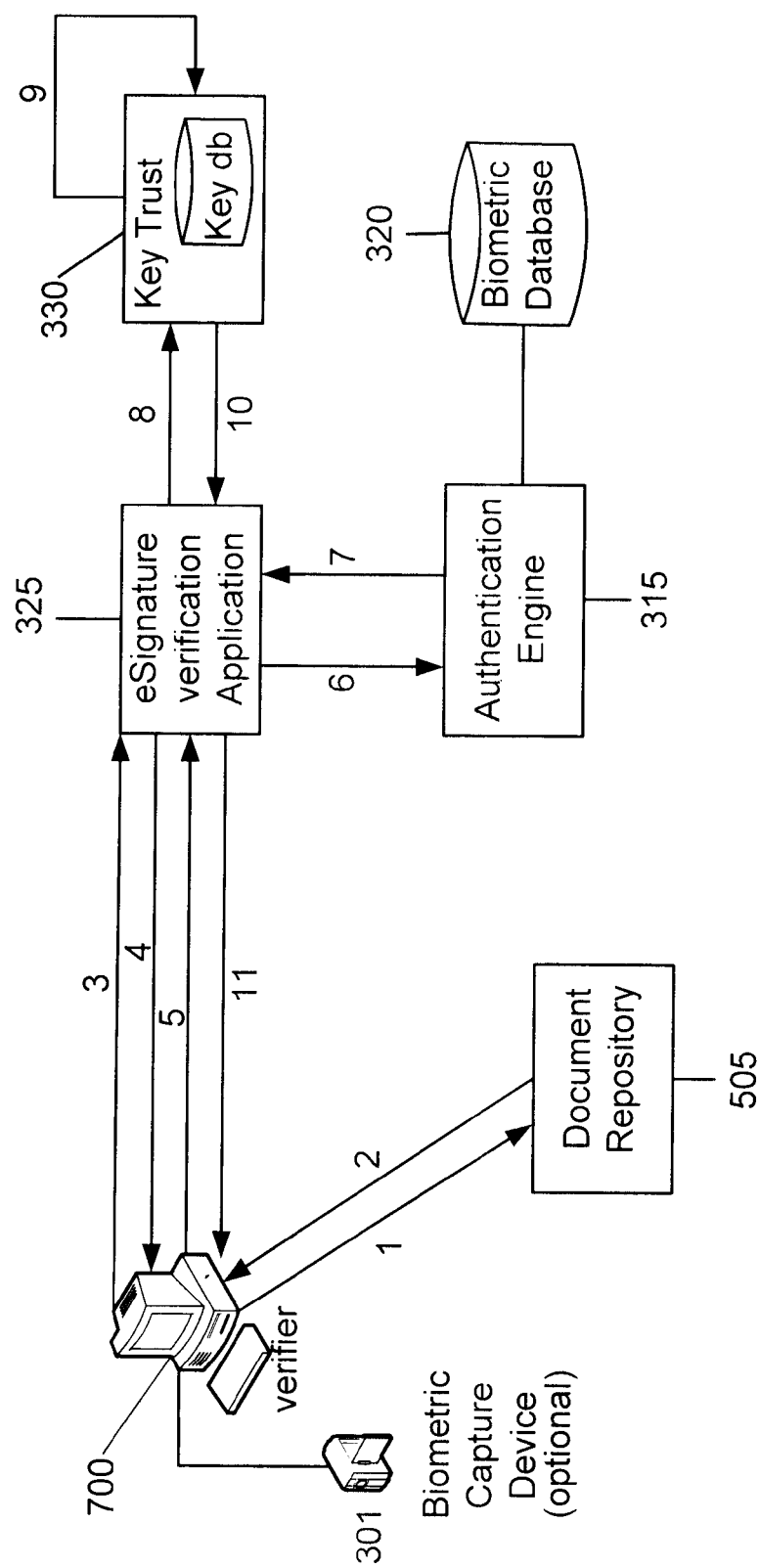
FIG. 16 shows a process flow for verification of a signature in applications where the key trust does not want to send key material to the verifier in accordance with an embodiment of the present invention.

However, for cases where the KT does not wish to send key material to the verifier, the protocol illustrated in FIG. 16 may be followed to verify the signature. Such cases may include where a symmetric key signature is used, where the KT does not want to release either symmetric or asymmetric key material, or where the verifier cannot perform signature verification.

If a verifier 707 does not already have the document and/or the signature, then it may obtain these from a document repository (steps 1 and 2). The verifier then generates a hash of the document, and sends this along with the signature to the e-signature verification application (Step 3). Both the signature and hash may be encrypted with the public-key of the KT, who will perform the actual verification, in order to prevent other entities accessing it. The verifier may be required to authenticate themselves or the request, biometrically or otherwise, to the signature verification application and/or the KT. In the case of biometric authentication, the authentication engine verifies the verifier's biometric, returning the result to the verification application (optional steps 4-7).

If the verification application is prepared to verify the signature for the requesting verifier, then the signature and corresponding hash are forwarded onto the KT (Step 8). The KT infers from the signature, the identifier of the key or keys necessary to verify the signature. The key or keys are then retrieved from a HSM or other secure storage (step 9). The signature is verified using the appropriate keys, and an indication of whether a valid signature was present is returned to the verification application (Step 10). This outcome is then forwarded on to the requesting verifier (Step 11). All messages may be encrypted and signed for security.

It will be appreciated that the implementation of the method of the present invention has involved authentication of a user at the authentication engine, based on a claim and their biometric identifier. The authentication engine uses the claim to retrieve one or more enrolled biometric identifiers for the user, against which the submitted biometric is compared (a process referred to as verification). However, it will be appreciated that a user may be identified by submitting a biometric identifier alone, without a specific claim. In this case the authentication engine will compare the submitted biometric identifier against a multiplicity of enrolled biometric identifiers (a process referred to as identification). When the AE finds the enrolled biometric identifier that best matches the submitted one, it will return the corresponding identity claim. An application receiving this verified claim, can then be assured that this user has been authenticated. It will be appreciated that such a method of identification without a claim, may be used within the method and system of the present invention in situations where verification has been described.

It will be appreciated that although the present invention has been described with reference to the application of a digital or electronic signature to documents that the word "document" is intended to cover any electronic object such as, but not limited to, text, pdf, source code, object code, binaries, images, multimedia files, transaction data, e-mail, messages etc.).

Once a document has been signed it may later be verified using conventional techniques such as that shown in FIG. 2, and it will be appreciated that no specific biometric technologies are required to verify a signature (for example if a CA has been used to certify the public keys). However, the KT (and perhaps the e-signature application) can be configured to store the signed digests generated for audit trail purposes.

It will also be appreciated that if the biometric identifier is incorporated into the electronic signature, as was described above according to an aspect of the present invention, that a modification to this conventional technique will be required to decipher the biometric identifier from the document signature and confirm that it is an authentic identifier.

It will be appreciated that although an exemplary embodiment of the present invention has been described for illustrative purposes as using public key digital signatures, that this is not intended to limit the present invention to such embodiments and varying implementations such as those using a symmetric key algorithm may be found suitable for specific applications. The present invention provides for a network accessible vault or data repository (eVault), which may be personalised for access by a plurality of users, each user having access defined by the user characteristics. By including a cryptographic key within the networked storage area and limiting access to that key to users having asserted and matched a biometric, the system provides for a network accessible cryptographic key associated with a user's biometric.

The words "comprises/comprising" and the words "having/including" when used herein with reference to the present invention are used to specify the presence of stated features, integers, steps or components but do not preclude the presence or addition of one or more other features, integers, steps, components or groups thereof.

It will be appreciated that in all steps security techniques are typically applied to protect the integrity of the communications channels and to guarantee freshness of the messages. It will be further appreciated that the invention is not limited to the embodiments described but may be varied in construction and detail.

The invention claimed is:

1. An electronic data vault system (eVault) for remotely and securely storing data for a user such that the user can subsequently access the data via a network interface, the system comprising:

a remote server comprising a document and data repository configured to securely store personal data for at least one user, wherein the secured personal data for each specific user is stored in a datastore associated with the specific user;

a key trust configured to generate at least one cryptographic key pair for the at least one user, to store a first cryptographic key of the at least one cryptographic key pair and to export a second cryptographic key of the at least one cryptographic key pair from the key trust;

a biometric database configured to provide a storage location for at least one biometric captured from and associated with the at least one user, wherein the biometric is captured during enrollment in the electronic data vault system;

an interface configured to allow controlled access to the remote server by the at least one user and to allow for transmission of the at least one captured user biometric to the system;

means for performing authentication of the at least one user using biometric matching and including an authentication engine configured to interface with the biometric database and to authenticate the at least one user based on a match of the at least one captured user biometric with previously stored biometrics, wherein the key trust is further configured to decrypt the first cryptographic key using a third cryptographic key that corresponds to a claim signed by the authentication engine during authentication of the at least one user;

means for executing one or more processes in communication with service providers, at least one of the processes being an enabling of completion of service application forms online and for automatically populating parts of the forms using data retrieved from within the electronic data vault system; and a policy management system configured to allow the at least one user to define policies controlling access of specific service providers to specific parts of a datastore of the at least one user, to define the data that is permitted to be deposited by specific service providers into the datastore of the at least one user, and to define default data access levels for service providers not specifically identified, wherein during authentication of the at least one user by the authentication engine, the system is configured to enable the authenticated at least one user to access the datastore specific to the authenticated at least one user, the specific datastore having a document and data repository and key trust personal to the authenticated at least one user, and to apply the first cryptographic key previously associated with the authenticated at least one user onto data stored within the document and data repository.

2. A system as claimed in claim 1, wherein the electronic data vault system is adapted to store documents associated with at least one user.

3. A system as claimed in claim 2, wherein the system further comprises means for certifying data or documents.

4. A system as claimed in claim 3 wherein the means for certifying data or documents comprises a process which includes selecting at least one of the following:

ensuring that data submitted by a service provider meets a correct predefined format;

ensuring that information included in the data corresponds to already certified data held in the user datastore;

ensuring that a service provider submitting data has correct permissions and has been authenticated to a necessary security level to submit the data;

ensuring that the user has provided permission for the data to be submitted, optionally from an identified service provider;

adding a timestamp to the submitted data; and applying at least one electronic signature to the submitted data.

5. A system as claimed in claim 2, wherein the system further comprises means for storing the data and documents in distributed locations for presenting a single centralised view to users.

6. A system as defined in claim 5 where the distributed locations include datastores managed and maintained by independent third-party service providers.

7. A system as claimed in claim 1 further comprising a data processing system.

8. A system as claimed in claim 1 further comprising a service provider interface for allowing controlled access by service providers for updating data and documents in the data and document repository, and performing processes requiring access to the data and documents.

9. A system as claimed in claim 1, wherein the interface comprises means for allowing access using a plurality of different types of devices including telephones, kiosks, ATMs, PDAs, mobile devices and Web browsers.

10. A system as claimed in claim 1, wherein the system comprises means for performing multi-modal biometric verification.

11. A system as claimed in claim 1 further comprising means for making at least one cryptographic key available for secure communication between the user and service providers.

12. A system as claimed in claim 1 further comprising means for updating the data within the eVault and means to enable third parties access to documents or data specifically related to one or more users, such that the third party is able to directly request the data from the eVault, or the eVault is configured to automatically push the data to specific third parties, when the data is updated within the eVault.

13. The system as claimed in claim 12, further comprising means for returning the first cryptographic key to the user on matching the identifier in the datastore with the supplied biometric identifier.

14. A system as claimed in claim 1 wherein the third cryptographic key is one of a single cryptographic key usable across a plurality of identity claims and a derived cryptographic key.

15. A system as claimed in claim 1 wherein the first cryptographic key is a private key and the second cryptographic key is a public key.

* * * * *